United States Patent
Sugita

(10) Patent No.: US 10,158,787 B2
(45) Date of Patent: Dec. 18, 2018

(54) CONTROL APPARATUS, IMAGE PROCESSING METHOD AND NON-TRANSITORY RECORDING MEDIUM STORING IMAGE PROCESSING PROGRAM

(71) Applicant: KONICA MINOLTA, INC., Chiyoda-ku, Tokyo (JP)

(72) Inventor: Tsuyoshi Sugita, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/783,249

(22) Filed: Oct. 13, 2017

(65) Prior Publication Data
US 2018/0109701 A1    Apr. 19, 2018

(30) Foreign Application Priority Data
Oct. 19, 2016    (JP) ................................. 2016-204881

(51) Int. Cl.
| | | |
|---|---|---|
| H04N 1/60 | (2006.01) | |
| G06T 11/00 | (2006.01) | |
| H04N 1/54 | (2006.01) | |
| H04N 1/52 | (2006.01) | |

(52) U.S. Cl.
CPC ......... *H04N 1/6022* (2013.01); *G06T 11/001* (2013.01); *H04N 1/54* (2013.01); *H04N 1/6008* (2013.01); *H04N 1/6094* (2013.01); *H04N 1/52* (2013.01)

(58) Field of Classification Search
CPC ...... H04N 1/6022; H04N 1/54; H04N 1/6008; H04N 1/6094; H04N 1/52; G06T 11/001
See application file for complete search history.

(56) References Cited

U.S. PATENT DOCUMENTS

2009/0033961 A1    2/2009 Tamagawa

FOREIGN PATENT DOCUMENTS

JP    2009-055600 A    3/2009

*Primary Examiner* — Christopher D Wait
(74) *Attorney, Agent, or Firm* — Buchanan Ingersoll & Rooney PC

(57) ABSTRACT

Provided are a control apparatus, an image processing method and a non-transitory recording medium. A hardware processor of the control apparatus controls the amount of color materials to be used in printing a source image together with a white base by adjusting pixel values of multi-valued pixels forming the source image and white base, and converts the multi-valued pixels into two-valued pixels corresponding to colors of the color materials of the source image and two-valued white pixels. In controlling the amount of color materials, the hardware processor, for each multi-valued pixel of the white base, defines the pixel value such that colored two-valued white pixels exist in a coverage ratio being equal to or greater than the total coverage ratio of the color materials of the source image. The hardware processor rearranges the two-valued white pixels so that colored two-valued white pixels are located at all the colored pixel positions.

21 Claims, 14 Drawing Sheets

OPAQUE SUBSTRATE

OPAQUE SUBSTRATE

TRANSPARENT SUBSTRATE

TRANSPARENT SUBSTRATE

TRANSPARENT SUBSTRATE

TRANSPARENT SUBSTRATE

FIG. 18

| W (WITE BASE) | M | Y | TOTAL COVERAGE RATIO |
|---|---|---|---|
| 80.0% | 80.0% | 80.0% | 96.0% |
| 82.0% | 79.0% | 79.0% | 95.6% |
| 84.0% | 78.0% | 78.0% | 95.2% |
| 86.0% | 77.0% | 77.0% | 94.7% |
| 88.0% | 76.0% | 76.0% | 94.2% |
| 90.0% | 75.0% | 75.0% | 93.8% |
| 92.0% | 74.0% | 74.0% | 93.2% |
| 93.0% | 73.5% | 73.5% | 93.0% |
| 94.0% | 73.0% | 73.0% | 92.7% |
| 96.0% | 72.0% | 72.0% | 92.2% |
| 98.0% | 71.0% | 71.0% | 91.6% |
| 100.0% | 70.0% | 70.0% | 91.0% |

CONTROL APPARATUS, IMAGE PROCESSING METHOD AND NON-TRANSITORY RECORDING MEDIUM STORING IMAGE PROCESSING PROGRAM

Japanese Patent Application No. 2016-204881 filed on Oct. 19, 2016, including description, claims, drawings, and abstract, the entire disclosure of which is incorporated herein by reference in its entirety.

TECHNICAL FIELD

The present invention is directed to control apparatuses, image processing methods and non-transitory recording media each storing an image processing program. In particular, the present invention is directed to a control apparatus for controlling a process of printing a source image together with a white base, an image processing method which includes controlling preparation of the white base, and a non-transitory recording medium storing a computer-readable program for image processing.

BACKGROUND

In printing a source image created by using process colors of C (Cyan), M (Magenta), Y (Yellow) and K (Key Plate) on a transparent substrate or a colored opaque substrate, a technique to print a base or undercoat colored in W (White) (hereinafter, referred to as a white base) together with the source image is used in view of the fact that the appearance of the printed source image can change in color by being affected by light coming from the outside through the transparent substrate or the color of the opaque substrate. In printing a source image on a transparent substrate, a white base is generally printed as the uppermost layer on the substrate, because the printed source image is shown from the opposite side of the printed surface of the transparent substrate. In printing a source image on an opaque substrate, a white base is generally printed as the lowermost layer on the substrate.

In printing a source image with a white base on a transparent substrate or an opaque substrate, it takes time to print the source image and the white base separately, and thus there are demands for on-demand printers with high productivity, capable of printing five colors of W for a white base and CMYK for a source image in a single pass. When executing the above printing by using electrophotography, there is a limit of the amount of color materials (the amount of toners) that can be transferred and fixed on a substrate at one time, and therefore, a color material limit or the maximum toner amount is defined for such printing, where the color material limit is generally represented by the total sum of pixel values (in percentages) corresponding to all the colors of color materials, in other words, the total sum of percentage values of all the colors of color materials specified for a pixel. In view of that, a printing system is configured to execute a process of controlling or limiting the amount of color materials, by controlling pixel values of pixels in a white base and pixel values of pixels in a source image so that the total sum of the pixel values corresponding to the color materials of the white base and the source image at the same printing position does not exceed the color material limit.

As an example of the technique of controlling the amount of color materials, Japanese Unexamined Patent Publication (JP-A) No. 2009-055600, which corresponds to United States Patent Application Publication No. US2009/033961A1, discloses the following image processing method applicable to an image output device. The image output device is configured to use a base color material and process colors materials to form a color image on a substrate, wherein colors of the image are defined on the basis of the total amount of the color materials given by a combination of the color materials per unit area. The image processing method includes a process of determining the provisional total amount of the color materials by adding the amount of the base color material being a certain value to the amount of the process color materials per unit area which are represented by a device signal supplied to the image output device. The processing method further includes a process of adjusting the total amount of the color materials which includes a process of reducing the provisional total amount of the color materials so that the provisional total amount of the color materials does not exceed the upper limit of the total amount of the color materials, defined for the image output device.

From an idealistic viewpoint, in order to secure the sufficient color reproducibility of a source image in printing the source image with a white base, the color material limit should be given as the sum of 100% and the maximum total amount of color materials of CMYK used in the source image. However, the color material limit that normal printing devices can handle is 400% or less, and it would be difficult to increase the value of the color material limit because it needs a significant improvement of the capacities of the printing devices for transferring toner and fixing toner on a substrate and a significant improvement of color materials. One of actual solutions for the problem is a reduction of the amount of each color material. Consideration is given to the reduction of the amount of color materials, with reference to the example that a printing device outputs one of secondary colors which are frequently used in color printing, under the condition that the color material limit is less than 300%. Secondary colors are colors represented by combinations of the maximum possible values of two of the CMY primary colors specified for a pixel (the maximum possible pixel values indicating two of the CMY primary colors), such as R (Red) being a mixture of 100% M and 100% Y, G (Green) being a mixture of 100% C and 100% Y, and B (Blue) being a mixture of 100% C and 100% M, and are hereinafter referred to as pure secondary colors. In this example, both of the amount of color materials of the primary colors (C, M, Y) to be used for the source image and the amount of white color material to be used for the white base should be reduced.

Consideration is further given to the reduction of the color materials to be used for the source image and the white base, with reference to two-valued pixels given after a screening (halftoning) process by using area gradation modulation or area coverage modulation. A screening (halftoning) process makes two-valued pixels including "colored" pixels and "uncolored" pixels for each of colors including the primary colors and white. Since a general screening process defines the arrangement of "colored" pixels and "uncolored" pixels in a stochastic manner, a composite image made of two-valued pixels corresponding to the primary colors and white given after the screening process, includes pixels colored in both of the primary color(s) and white, pixels colored just in the primary color(s), pixels colored just in white, and pixels colored in none of the primary colors and white.

To reduce the influence of light coming from the outside through the transparent substrate or the color of the opaque substrate on the appearance of the printed source image, it is preferable that the screening process defines the arrangement of white-colored pixels so as to increase the number of white-colored pixels at the pixel positions to be colored in at least one of the primary color as much as possible. However, after each of the amounts of color materials of the primary colors (C, M, Y) for the source image and the amount of white color material for the white base is reduced by the same percentage, the screening process of the white base does not create enough number of white-colored pixels to be placed at all the pixel positions to be colored in at least one of the primary colors. As a result, some of the pixels colored just in the primary color(s) in the printed source image can be affected by light coming from the outside through the transparent substrate or the color of the opaque substrate, and it may make difficult to fully take advantage of the color gamut which can be represented by the color materials and coloring characteristics of the color materials.

SUMMARY

The present invention is directed to control apparatuses, image processing methods and non-transitory recording media each storing a computer-readable program for image processing, which can effectively prepare a white base to be printed together with a source image, to improve the color reproducibility of the source image and fully take advantage of the color gamut which can be represented by color materials and the coloring characteristics of color materials.

A control apparatus reflecting one aspect of the present invention is a control apparatus for controlling a printing device configured to print a color source image together with a white base by using color materials of a plurality of colors including cyan, magenta and yellow for the source image and a white color material for the white base. The control apparatus comprises: a raster-image processor that creates multi-valued pixels forming the source image and multi-valued pixels forming the white base; and a hardware processor that performs the following operations. The operations include controlling the amount of the color materials to be used in printing the source image together with the white base, by defining pixel values of the multi-valued pixels forming the source image and pixel values of the multi-valued pixels forming the white base so that the total sum of the pixel values corresponding to colors of the color materials of the source image and the pixel value corresponding to white at the same printing position becomes a color material limit or less. The operations further include, by using screening, converting each of the multi-valued pixels forming the source image and each of the multi-valued pixels forming the white base given after controlling the amount of the color materials, into matrixes of two-valued pixels corresponding to the colors of the color materials of the source image and a matrix of two-valued white pixels corresponding to white, to create sets of two-valued pixels corresponding to the colors of the color materials, forming the source image and a set of two-valued white pixels forming the white base. The operations further include performing a rearrangement of the two-valued white pixels, by using the matrixes of two-valued pixels corresponding to the colors of the color materials of the source image and the matrix of two-valued white pixels, given by converting each of the multi-valued pixels forming the source image and each of the multi-valued pixels forming the white base at the same printing position. The rearrangement includes using the matrixes of two-valued pixels corresponding to the colors of the color materials of the source image, to determine first pixel positions at each of which at least one of the two-valued pixels corresponding to primary colors of cyan, magenta and yellow is colored and second pixel positions at each of which none of two-valued pixels corresponding to the primary colors is colored. The rearrangement further includes using the matrix of two-valued white pixels, to rearrange at least one of colored two-valued white pixels at the second pixel positions in the matrix of two-valued white pixels, at a pixel position or positions at each of which a colored two-valued white pixel is absent among the first pixel positions in the matrix of two-valued white pixels. The rearrangement further includes outputting the set of two-valued white pixels forming the white base, which have been rearranged. In controlling the amount of the color materials, the hardware processor uses the pixel values corresponding to the colors of the color materials of the source image, specified for each of the multi-valued pixels forming the source image, to calculate the total coverage ratio of the color materials of the source image, being a ratio of an area to be colored with at least one of the color materials of the source image to the whole area of the matrix of the two-valued pixels, for each of the multi-valued pixels forming the source image. The hardware processor then defines the pixel value corresponding to white, specified for each of the multi-valued pixels forming the white base, corresponding to the each of the multi-valued pixels forming the source image, such that colored two-valued white pixels exist in a coverage ratio being equal to or greater than the total coverage ratio, in the matrix of two-valued white pixels corresponding to the each of the multi-valued pixels forming the white base. In the rearrangement, the hardware processor arranges the two-valued white pixels so that the colored two-valued white pixels are located at all the first pixel positions.

An image processing method reflecting one aspect of the present invention is a method for use in a printing system including a printing device and a control apparatus for controlling the printing device. The printing device is configured to print a color source image together with a white base by using color materials of a plurality of colors including cyan, magenta and yellow for the source image and a white color material for the white base. The method comprises: using a raster-image processor of the control apparatus to create multi-valued pixels forming the source image and multi-valued pixels forming the white base; and controlling by a hardware processor of the control apparatus, the amount of the color materials to be used in printing the source image together with the white base, by defining pixel values of the multi-valued pixels forming the source image and pixel values of the multi-valued pixels forming the white base so that the total sum of the pixel values corresponding to colors of the color materials of the source image and the pixel value corresponding to white at the same printing position becomes a color material limit or less. The method further comprises: by using screening, converting, by the hardware processor, each of the multi-valued pixels forming the source image and each of the multi-valued pixels forming the white base given after controlling the amount of the color materials, into matrixes of two-valued pixels corresponding to the colors of the color materials of the source image and a matrix of two-valued white pixels corresponding to white, to create sets of two-valued pixels corresponding to the colors of the color materials, forming the source image and a set of two-valued white pixels forming the white base. The method further comprises: rearranging the two-valued white pixels by the hardware processor, by using the matrixes of two-valued pixels corresponding to the colors of the color materials of the source image and the matrix of two-valued white pixels, given by converting each of the multi-valued pixels forming the source image and each of the multi-valued pixels forming the white base at a same printing position. The rearranging includes using the matrixes of two-valued pixels corresponding to the colors of the color materials of the source image, to determine first pixel positions at each of which at least one of the two-valued pixels corresponding to primary colors of cyan, magenta and yellow is colored and second pixel positions at each of which none of two-valued pixels corresponding to the primary colors is colored. The rearranging further includes using the matrix of two-valued white pixels, to rearrange at least one of colored two-valued white pixels at the second pixel positions in the matrix of two-valued white pixels, at a pixel position or positions at each of which a colored two-valued white pixel is absent among the first pixel positions in the matrix of two-valued white pixels. The rearranging further includes outputting the set of two-valued white pixels forming the white base, which have been rearranged. The controlling includes using the pixel values corresponding to the colors of the color materials of the source image, specified for each of the multi-valued pixels forming the source image, to calculate the total coverage ratio of the color materials of the source image, being a ratio of an area to be colored with at least one of the color materials of the source image to the whole area of the matrix of the two-valued pixels, for each of the multi-valued pixels forming the source image. The controlling further includes defining the pixel value corresponding to white, specified for each of the multi-valued pixels forming the white base, corresponding to the each of the multi-valued pixels forming the source image, such that colored two-valued white pixels exist in a coverage ratio being equal to or greater than the total coverage ratio, in the matrix of two-valued white pixels corresponding to the each of the multi-valued pixels forming the white base. The rearranging includes arranging the two-valued white pixels so that the colored two-valued white pixels are located at all the first pixel positions.

A non-transitory recording medium reflecting one aspect of the present invention stores a computer-readable program for image processing to be executed in a control apparatus for controlling a printing device. The printing device is configured to print a source image together with a white base by using color materials of a plurality of colors including cyan, magenta and yellow for the source image and a white color material for the white base. The control apparatus includes a raster-image processor that creates multi-valued pixels forming the source image and multi-valued pixels forming the white base. The program comprises instructions which, when executed by a hardware processor of the control apparatus, cause the control apparatus to perform the following operations. The operations comprise obtaining the multi-valued pixels forming the source image and the multi-valued pixels forming the white base, from the raster-image processor; and controlling an amount of the color materials to be used in printing the source image together with the white base, by defining pixel values of the multi-valued pixels forming the source image and pixel values of the multi-valued pixels forming the white base so that the total sum of the pixel values corresponding to colors of the color materials of the source image and the pixel value corresponding to white at the same printing position becomes a color material limit or less. The operations further comprise, by using screening, converting each of the multi-valued pixels forming the source image and each of the multi-valued pixels forming the white base given after controlling the amount of the color materials, into matrixes of two-valued pixels corresponding to the colors of the color materials of the color source image and a matrix of two-valued white pixels, corresponding to white, to create sets of two-valued pixels corresponding to the colors of the color materials, forming the source image and a set of two-valued white pixels forming the white base. The operations further comprise rearranging the two-valued white pixels, by using the matrixes of two-valued pixels corresponding to the colors of the color materials of the source image and the matrix of two-valued white pixels, given by converting each of the multi-valued pixels forming the source image and each of the multi-valued pixels forming the white base at the same printing position The rearranging includes using the matrixes of two-valued pixels corresponding to the colors of the color materials of the source image, to determine first pixel positions at each of which at least one of the two-valued pixels corresponding to primary colors of cyan, magenta and yellow is colored and second pixel positions at each of which none of two-valued pixels corresponding to the primary colors is colored. The rearranging further includes using the matrix of two-valued white pixels, to rearrange at least one of colored two-valued white pixels at the second pixel positions in the matrix of two-valued white pixels, at a pixel position or positions at each of which a colored two-valued white pixel is absent among the first pixel positions in the matrix of two-valued white pixels. The rearranging further includes outputting the set of two-valued white pixels forming the white base, which have been rearranged. The controlling includes using the pixel values corresponding to the colors of the color materials of the source image, specified for each of the multi-valued pixels forming the source image, to calculate the total coverage ratio of the color materials of the source image, being a ratio of an area to be colored with at least one of the color materials of the source image to the whole area of the matrix of the two-valued pixels, for each of the multi-valued pixels forming the source image. The controlling further includes defining the pixel value corresponding to white, specified for each of the multi-valued pixels forming the white base, corresponding to the each of the multi-valued pixels forming the source image, such that colored two-valued white pixels exist in a coverage ratio being equal to or greater than the total coverage ratio, in the matrix of two-valued white pixels corresponding to the each of the multi-valued pixels forming the white base. The rearranging includes arranging the two-valued white pixels so that the colored two-valued white pixels are located at all the first pixel positions.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 18 is an example of a table illustrating the relationship between the coverage ratio of white color material (a pixel value corresponding to white) and the total coverage ratio of color materials, according to one embodiment of the present invention.

DETAILED DESCRIPTION OF EMBODIMENTS

Hereinafter, one or more embodiments of the present invention will be described with reference to the drawings. However, the scope of the invention is not limited to the illustrated embodiments.

As described in the above BACKGROUND, in printing five colors of W for a white base and CMYK for a source image in a single pass by using electrophotography, there is a limit of the amount of color materials (the amount of toners) that can be transferred and fixed on a substrate at one time, and therefore, a color material limit is defined for such printing. In the printing, a raster-image processor, profile creating section or print engine in a printing system executes a process of controlling the amount of color materials, by controlling pixel values of pixels in a source image and pixel values of pixels in a white base so that the total sum of the pixel values corresponding to colors of the color materials of the white base and the source image at the same printing position does not exceed the color material limit (the maximum tonner amount).

Figure 1A:
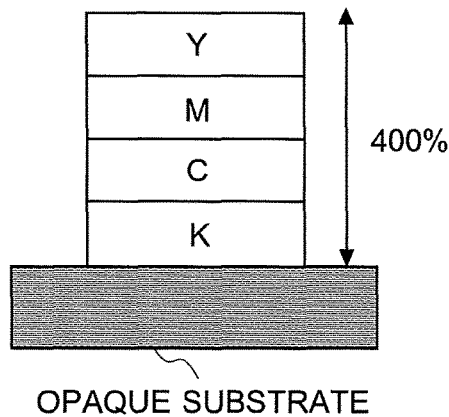
FIGS. 1A and 1B are schematic diagrams illustrating the maximum total pixel value in the case that four colors of CMYK are printed on an opaque substrate.
Figure 1B:
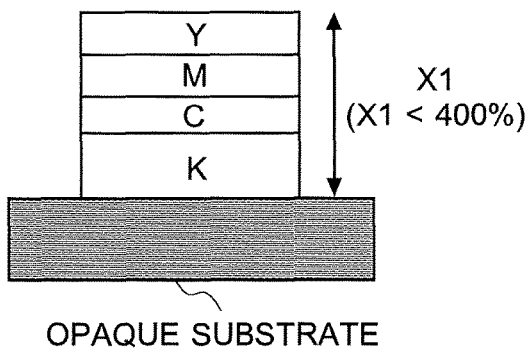

To execute the process of controlling the amount of color materials, the color material limit is defined according to the capacities of a printing device for transferring toner and fixing toner on a substrate. In the example that a printing device prints a source image by using CMYK color materials (toners) on an opaque substrate like paper, the maximum total pixel value in source data is 400% as illustrated in FIG. 1A, and the maximum total pixel value X1 in source data given after the process of controlling the amount of color materials becomes less than 400% as illustrated in FIG. 1B, which needs a reduction of toner of each color. In the controlling process, the reduced toner amounts of the colors may be the same or different from each other, or the certain amounts of CMY toners may be replaced with the corresponding amount of K toner. The concrete toner amounts (for example, weight) of the colors each equivalent to 100% may be different from each other.

Figure 2A:
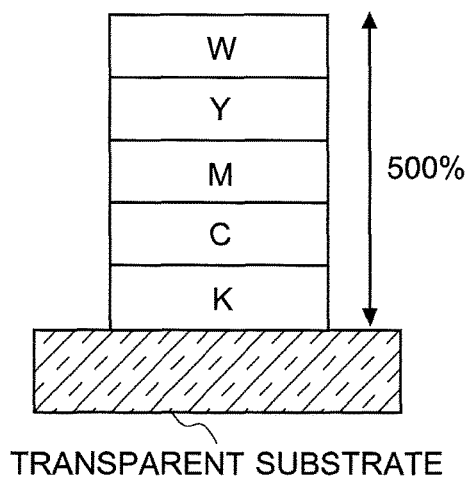
FIGS. 2A and 2B are schematic diagrams illustrating the maximum total pixel value in the case that five colors of CMYKW are printed on a transparent substrate.
Figure 2B:
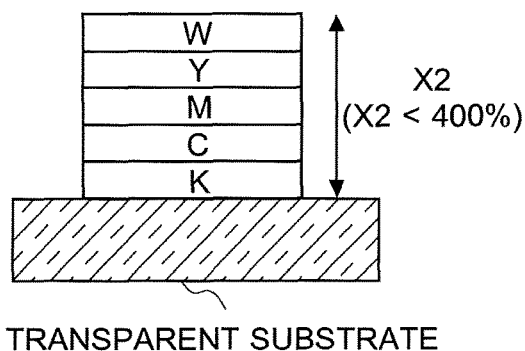

In another example that a printing device prints a source image by using CMYK color materials together with a base by using W color material on a transparent substrate like a plastic film, the W color material is printed as the uppermost layer on the transparent substrate in general and the maximum total pixel value in source data is 500%, as illustrated in FIG. 2A. Since an increase of the color material limit needs an improvement of the capacities of the printing device for transferring toner and fixing toner on a substrate and an improvement of toners, the maximum total pixel value X2 in the source data given after the process of controlling the amount of color materials in this example is still less than 400% as illustrated in FIG. 2B. A use of the W color material in this printing further reduces the possible color material amount distributed to each of CMYK colors. In another example that a printing device prints a source image by using CMYK color materials together with a base by using W color material on an opaque substrate, the W color material is printed as the lowermost layer on the opaque substrate in general. Similarly to the above example, the maximum total pixel value in the source data given after the process of controlling the amount of color materials is less than 400% and a use of the W color material in this printing also reduces the possible color material amount distributed to each of CMYK colors.

Figure 3A:
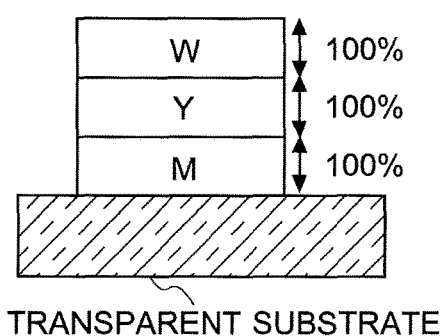
FIGS. 3A and 3B are schematic diagrams illustrating the maximum total pixel value in the case that white and one of the pure secondary colors are printed on a transparent substrate.
Figure 3B:
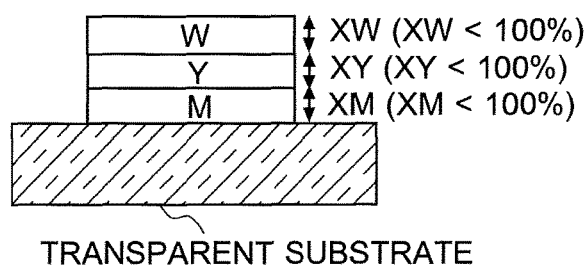

In another example that a printing device prints a source image of one of the pure secondary colors (in this case, pure red), which are R (C, M, Y, K=0, 100, 100, 0), G (C, M, Y, K=100, 0, 100, 0) and B (C, M, Y, K=100, 100, 0, 0), together with a base colored in W on a transparent substrate, the maximum total pixel value in the source data is 300% (100% for each of YMW colors) as illustrated in FIG. 3A. When the color material limit is much less than 300%, a problem arises in color reproduction of the pure secondary color. For example, when the color material limit is less than 250%, both of the amounts of primary color materials and the amount of W color material should be reduced, as illustrated in FIG. 3B. Under the condition that the color material limit is 240%, the amount of color material of each of M, Y and W is reduced so that each of the maximum pixel values XM, XY and XW corresponding to M, Y and W becomes 80% equally after the process of controlling the amount of color materials.

Figure 4:
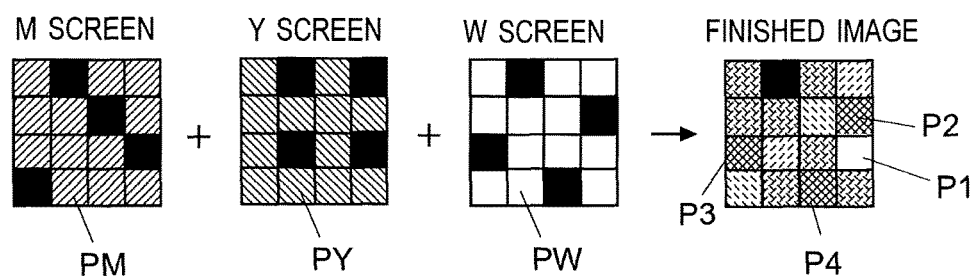
FIG. 4 is a schematic diagram illustrating a conventional screening process.

Consideration is given to the reduction of the color materials for the source image and the white base, with reference to two-valued pixels given after a screening (halftoning) process. A screening (halftoning) process makes two-valued pixels including "colored" pixels and "uncolored" pixels for each of colors including the primary colors and white. FIG. 4 illustrates an example of M screen, Y screen and W screen to be used for printing a source image of pure red together with a white base, where the M screen, Y screen and W screen are given by reducing each of pixel values corresponding to M, Y and W specified for a pixel in the source image and the corresponding a white pixel in the base so as to reduce each of the amounts of color materials of M, Y and W to 75% and then performing a screening process on the pixel in the source image and the corresponding white pixel in the base. In the M screen, hatched pixels PM are pixels colored in M (colored with M color material). In the Y screen, hatched pixels PY are pixels colored in Y (colored with Y color material). In the W screen, white pixels PW are pixels colored in W (colored with W color material) or white-colored pixels. In the M screen, Y screen and W screen, black pixels are pixels colored in none of M, Y and W. The finished image in FIG. 4 is an image given by combining these screens, wherein different combinations of colors are represented by different types of hatching. In the finished image, pixel P1 at row 3 and column 4 is colored just in white excluding the primary colors, and pixel P2 at row 2 and column 4, pixel P3 at row 3 and column 1, and pixel P4 at row 4 and column 3 are pixels colored just in the primary colors excluding white.

Figure 5A:
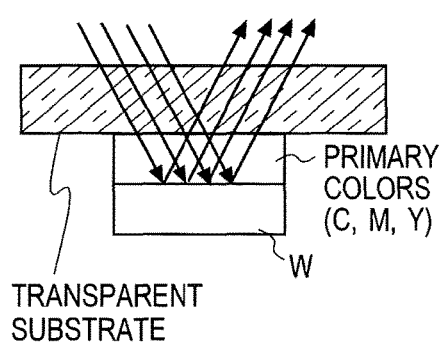
FIGS. 5A and 5B are schematic diagrams illustrating effects of a white base.
Figure 5B:
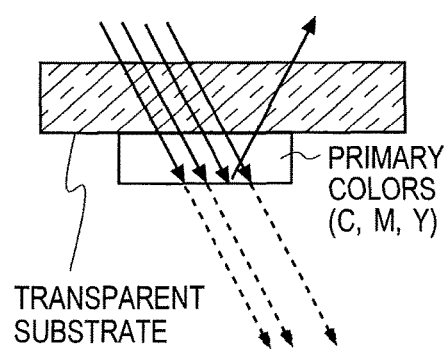

Since a general screening process defines the arrangement of "colored" pixels and "uncolored" pixels in a stochastic manner, a composite image made of two-valued pixels corresponding to the primary colors and white given after the screening process, includes pixels colored in both of the primary color(s) and white, pixels colored just in the primary color(s), pixels colored just in white, and pixels colored in none of the primary colors and white. A consideration of color reproduction on these types of pixel is given. As illustrated in FIG. 5A, at the position of a pixel where a white base is placed together with primary color materials, incident light entering from the opposite side of the printed surface of the transparent substrate is reflected by the white base. Therefore, the color of the pixel is perceived as high-lightness and high-chroma color in comparison with a pixel without a white base. As illustrated in FIG. 5B, at the position of a pixel where no white base is present, incident light entering from the opposite side of the printed surface of the transparent substrate passes through the primary color materials. Therefore, the color of the pixel is perceived as low lightness and low chroma color in comparison with a pixel with a white base.

As described above, a white base is important from the standpoint of improvement of lightness and chroma. As a result of studies of favorable positions of two-valued pixels colored in white, forming a white base given after the process of controlling the amount of color materials and the process of screening, the inventor has found that, in a source image of high-chroma color (color close to one of the pure secondary colors), pixels colored only in white excluding the primary colors have adverse effects on reproduction of the color (contribute less to increase chroma).

In view of that, the prior patent application that the applicant applied, U.S. patent application Ser. No. 15/695,248 proposes a method of rearranging at least one of white-colored two-valued pixels at the pixel positions at each of which none of two-valued pixels corresponding to the primary colors is colored (uncolored pixel positions), at another or other pixel positions at each of which a white-colored two-valued pixel is absent and at least one of the two-valued pixels corresponding to primary colors is colored (colored pixel positions). In concrete terms, the prior patent application proposes the following method for enhancing coloring characteristics of color materials. The proposed method includes a process of, when judging one of multi-valued pixels forming the source image as being colored in high-chroma color which is close to one of the pure secondary colors, rearranging white-colored two-valued pixels so as to increase the ratio of white-colored two-valued pixels at the colored pixel positions at each of which at least one of the two-valued pixels corresponding to primary colors is colored (in other words, to arrange white-colored two-valued white pixels preferentially at the colored pixel positions).

Figure 6A:
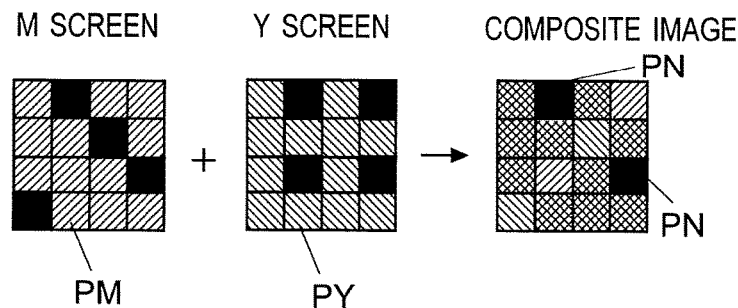
FIGS. 6A and 6B are schematic diagrams for illustrating a rearrangement of white-colored pixels given after a screening process, according to a prior patent application.
Figure 6B:
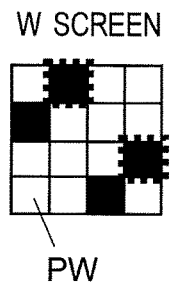

FIGS. 6A and 6B are schematic diagrams for illustrating an image processing method of the prior patent application, in the case that a source image of pure red is printed together with a base colored in W. Similarly to the example of FIG. 4, FIGS. 6A and 6B illustrate an example of M screen, Y screen and rearranged W screen to be used for printing a source image of pure red together with a white base, where the M screen, Y screen and W screen are given by reducing each of pixel values corresponding to M, Y and W specified for a pixel in the source image and a corresponding white pixel in the base so as to reduce each of the toner amounts of M, Y and W to 75% and then performing a screening process on the pixel in the source image and the corresponding white pixel in the base. In the M screen in FIG. 6A, hatched pixels PM are pixels colored in M (colored with M color material). In the Y screen in FIG. 6A, hatched pixels PY are pixels colored in Y (colored with Y color material). The composite image in FIG. 6A is an image given by combining these two screens. In the composite image in FIG. 6A, similarly to the M screen and Y screen, a pixel colored in at least one of M and Y is represented by a hatched pixel, and different combinations of colors are represented by different types of hatching. Black pixels PN are uncolored pixels which are pixels colored in none of M and Y. In the W screen in FIG. 6B, white pixels PW are pixels colored in W (colored with W color material) or white-colored pixels. When one of multi-valued pixels forming the source image is colored in high-chroma color which is close to one of the pure secondary colors, the white-colored pixels in the W screen are rearranged so as to reduce the white-colored pixels at the positions of the uncolored pixels, which are enclosed with broken lines, as much as possible (in other words, arranges white-colored pixels preferentially at the colored pixel positions), as illustrated in the W screen in FIG. 6B.

The arrangement of white-colored two-valued pixels preferentially at the positions of the colored pixels, improves color reproducibility of the printed source image. However, after each of the amounts of color materials of the primary colors (C, M, Y) forming the source image and the amount of white color material forming the white base is reduced by the same percentage, the screening process of the white base does not create enough number of white-colored two-valued pixels to be placed at all the pixel positions to be colored in at least one of the primary colors. In order to fully take advantage of the color gamut which can be represented by the color materials and to obtain the stable appearance of the printed source image irrespective of the condition of the background of the printed source image, it is preferable to arrange white-colored two-valued pixels at all the positions of the pixels colored in at least one of the primary colors (in other words, to arrange white-colored two-valued pixels so as to cover the whole area colored in at least one of the primary colors).

In view of that, a control apparatus as one embodiment of the present invention is configured to perform the following processing, for printing a color source image together with a white base on a transparent or opaque substrate by using color materials (toners) of plural colors for the source image and a white color material for the white base. In the printing, the amount of toners to be used for both of the source image and the white base is reduced in order to print the color source image and the white base in a single path even under the tough condition such that the color material limit is less than 250%. In the process of controlling the amount of color materials, the control apparatus adjusts a pixel value corresponding to white, specified for each of multi-valued pixels forming the white base, as follows. The control apparatus uses pixel values corresponding to colors of color materials of the source image, specified for each of multi-valued pixels forming the source image, to calculate the total coverage ratio of the color materials of the source image (the coverage ratio of an area to be colored with at least one of the color materials of the source image), for each of the multi-valued pixels forming the source image. Using the total coverage ratio, the control apparatus defines the value of the coverage ratio of white color material (the pixel value corresponding to white) for each of the multi-valued pixels forming the white base, so as to secure the amount of white color material for the white base, being sufficient to fully take advantage of the color gamut which can be represented by the color materials and the coloring characteristics of the color materials.

In concrete terms, in printing a color source image together with a white base by using color materials of a plurality of colors including CMY colors for the color source image and white color material for the white base, the control apparatus creates multi-valued pixels forming the source image and multi-valued pixels forming the base. The control apparatus then controls the amount of color materials to be used in printing the source image together with the base, by defining pixel values of the multi-valued pixels forming the source image and pixel values of the multi-valued pixels forming the white base so that the total sum of pixel values corresponding to colors of the color materials of the source image and a pixel value corresponding to white at the same printing position becomes the color material limit or less. In the process of controlling the amount of color materials, the control apparatus uses pixel values corresponding to colors of the color materials of the source image, specified for each of the multi-valued pixels forming the source image, to calculate the total coverage ratio of the color materials of the source image, which is a coverage ratio of an area to be colored in a screening process with at least one of the color materials of the source image, for each of the multi-valued pixels forming the source image. Using the total coverage ratio calculated for each of the multi-valued pixels forming the source image, the control apparatus defines the coverage ratio of white color material (the pixel value corresponding to white) for the corresponding one of the multi-valued pixels forming the white base, such that colored two-valued white pixels are printed in the coverage ratio being equal to or greater than the total coverage ratio (in other words, such that when converting the multi-valued pixel forming the white base into a matrix of two-valued white pixels by using screening, colored two-valued white pixels exist in a coverage ratio being equal to or greater than the total coverage ratio, in the matrix of two-valued white pixels). After the process of controlling the amount of color materials, the control apparatus, by using screening, converts each of the multi-valued pixels forming the source image and each of the multi-valued pixels forming the base given after the process of controlling the amount of color materials, into matrixes of two-valued pixels (halftone cells) corresponding to the colors of the color materials of the source image and a matrix of two-valued white pixels (halftone cells) corresponding to white, to create sets of two-valued pixels corresponding to the colors of the color materials, forming the source image and a set of two-valued white pixels forming the white base. The control apparatus then rearranges the two-valued white pixels, by using the matrixes of two-valued pixels corresponding to colors of the color materials of the source image and the matrix of two-valued white pixels, given by converting each of the multi-valued pixels forming the source image and each of the multi-valued pixels forming the white base at the same printing position. In the rearrangement process, the control apparatus uses the matrixes of two-valued pixels corresponding to colors of the color materials of the source image, to determine first (colored) pixel positions at each of which at least one of the two-valued pixels corresponding to the CMY primary colors is colored and second (uncolored) pixel positions at each of which none of two-valued pixels corresponding to the primary colors is colored. The control apparatus further uses the matrix of two-valued white pixels, to rearrange at least one of colored two-valued white pixels at the second (uncolored) pixel positions in the matrix of two-valued white pixels, at a pixel position or positions at each of which a colored two-valued white pixel is absent among the first (colored) pixel positions in the matrix of two-valued white pixels (in other words, move at least one of colored two-valued white pixels at the second pixel positions in the matrix of two-valued white pixels, to a pixel position or positions at each of which a colored two-valued white pixel is absent among the first pixel positions in the matrix of two-valued white pixels). The control apparatus then outputs the set of two-valued white pixels forming the white base, which have been rearranged. In the rearrangement process, the control apparatus arranges the two-valued white pixels so that the colored two-valued white pixels are located at all the first (colored) pixel positions (in other words, so that the whole area in which at least one of the two-valued pixels corresponding to the primary colors is colored, is covered with the colored two-valued white pixels). If necessary (for example, in the case that the number of colored two-valued white pixels in the matrix of two-valued white pixels is greater than the number of the first pixel positions in in the matrix of two-valued white pixels), the control apparatus may arrange the excess of the colored two-valued white pixels over the number of the first (colored) pixel positions, at the second (uncolored) pixel position or positions each neighboring one of the first (colored) pixel positions.

Figure 7:
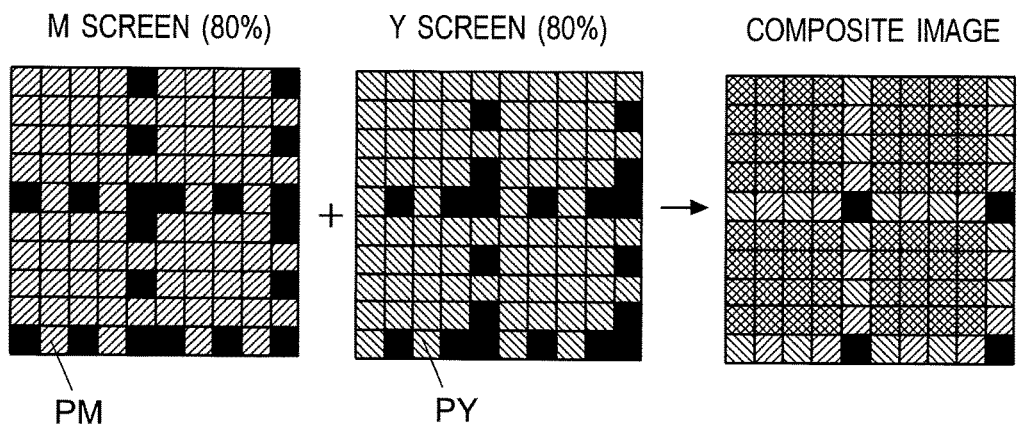
FIG. 7 is a schematic diagram for illustrating the coverage ratio of an area to be colored with white color material according to one embodiment of the present invention.

FIG. 7 is a schematic diagram for illustrating the coverage ratio of white color material for a white base to be printed with a source image of pure red. As described above, pure red or 100% R is reproduced by a combination of two color materials of M and Y, and a combination of 100% M and 100% Y is used in printing the source image of pure red as it is. In printing the source image of pure red together with a white base by using a printing device for which 240% of the color material limit is defined, a reduction of the amount of each color material equally, results in 80% M, 80% Y and 80% W. FIG. 7 illustrates an example of M screen and Y screen to be used for printing the source image of pure red together with a white base, where the M screen and Y screen are given by performing a screening process on a pixel in the source image after the reduction of the amount of color materials. In the M screen in FIG. 7, hatched pixels PM are pixels colored in M. In the Y screen in FIG. 7, hatched pixels PY are pixels colored in Y. The composite image in FIG. 7 is an image given by combining the M and Y screens. When the combination of the M and Y screens is printed on a substrate, it makes an area colored with both of M and Y color materials, an area colored only with M color material, an area colored only with Y color material and an area colored with none of M and Y color materials, on the substrate. The areas colored with at least one of the color materials correspond to colored pixels, and different combinations of colors of the colored pixels are represented by different types of hatching in FIG. 7. The areas colored with none of M and Y color materials are represented by black areas and correspond to uncolored pixels in FIG. 7. In the example of FIG. 7, the coverage ratio of the area (pixels) colored in R (colored with M and Y color materials) is 64% (=80%×80%), the coverage ratio of the area (pixels) colored just with M color material is 16% (=80%−64%), and the coverage ratio of the area (pixels) colored just with Y color material is 16% (=80%−64%). In total, 96% (=64%+16%+16%) of the whole area is colored with any of the color materials. In other words, the coverage ratio of the pixels colored at least with M color material is 80%, the coverage ratio of the pixels colored at least with Y color material is 80%, the coverage ratio of the pixels colored with M and Y color materials (pixels colored in R) is 64% (=80%×80%). The total coverage ratio of the area colored with any of the color materials (the area of the colored pixels) is 96% (=80%+80%−64%), and the coverage ratio of the area colored with no color material (the area of the uncolored pixels) is 4%.

Since a white base is important to maintain the coloring characteristics of CMY color materials regardless of the type of a substrate, the area colored with any of the color materials should be covered with color material of the white base in order to maintain the coloring characteristics, and 96% of the W screen should be colored with white color material from an idealistic viewpoint. It means that the white screen in which the white color material amount (a pixel value corresponding to white) has been reduced to W80% is 16% short of the enough coverage of the white color material. In view of that, a control apparatus as one embodiment of the present invention is configured to control the amount of color materials to be used in printing a source image together with a white base, by defining pixel values of the multi-valued pixels forming the source image and pixel values of the multi-valued pixels forming the white base so that the total sum of the pixel values corresponding to colors of the color materials of the source image and the pixel value corresponding to white at the same printing position becomes the color material limit or less. In the control of the amount of color materials, the control apparatus uses the pixel values corresponding to the colors of the color materials of the source image, to calculate the total coverage ratio of the color materials of the source image for each of the multi-valued pixels forming the source image. Using the coverage ratio for the each multi-valued pixel, the control apparatus defines the coverage ratio of white color material (equivalent to a pixel value corresponding to white) for corresponding one of the multi-valued pixels forming the source image. The control apparatus is further configured to, by using screening, convert each of the multi-valued pixels forming the source image and each of the multi-valued pixels forming the white base given after controlling the amount of the color materials, into matrixes of two-valued pixels corresponding to the colors of the color materials of the source image and a matrix of two-valued white pixels corresponding to white. The control apparatus is further configured to rearrange the two-valued white pixels in each matrix of two-valued white pixels so that colored two-valued white pixels are located at all the pixel positions (first or colored pixel positions) at each of which at least one of the two-valued pixels corresponding to primary colors is colored. These operations of the control apparatus allows a printing device to print the source image together with the white base with fully taking advantage of the effects of the white base.

EXAMPLES

Figure 8:
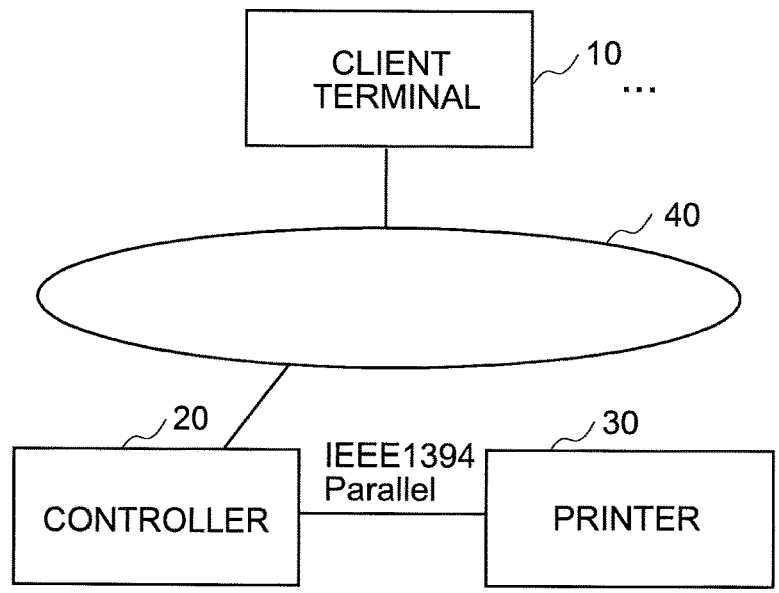
FIG. 8 is a schematic diagram illustrating an example of the constitution of a printing system according to one embodiment of the present invention.
Figure 9:
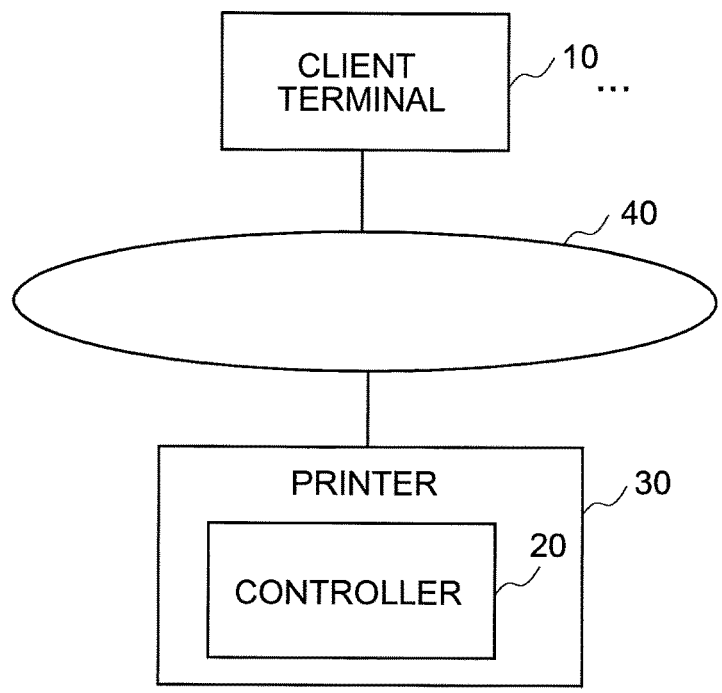
FIG. 9 is a schematic diagram illustrating another example of the constitution of a printing system according to one embodiment of the present invention.
Figure 19:
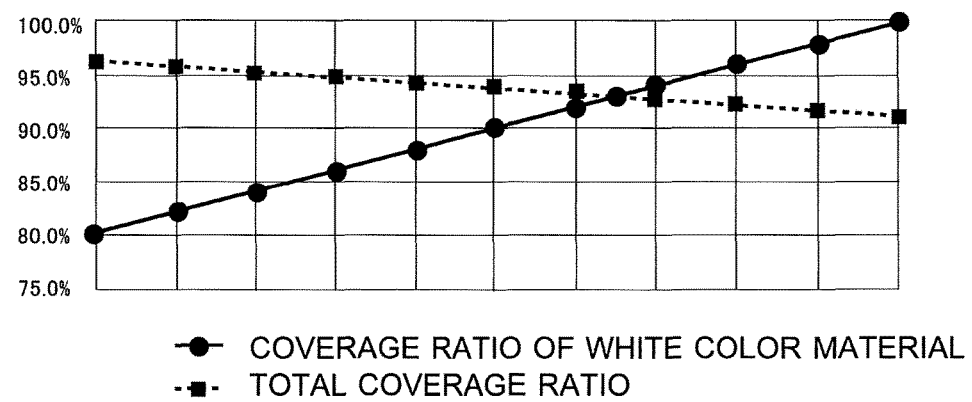
FIG. 19 is a graph illustrating the relationship between the coverage ratio of white color material (a pixel value corresponding to white) and the total coverage ratio of color materials, according to one embodiment of the present invention.

In order to describe an embodiment of the present invention in more in detail, a description is given to one example of a control apparatus, an image processing method and a non-transitory medium storing an image processing program according to one embodiment of the present invention, with reference to FIGS. 8 to 19. Each of FIG. 8 and FIG. 9 is a schematic diagram illustrating a constitution example of a printing system of the present example. FIGS. 10A to 12 are block diagrams illustrating a constitution example of a client terminal, a controller and a printer of the present example. Each of FIGS. 13 to 16 is a flowchart illustrating operations of the controller of the present example. FIGS. 17A and 17B are schematic diagrams illustrating a calculation of the coverage ratio of an area colored with white color material. FIG. 18 and FIG. 19 are a table and graph illustrating the relationship between the coverage ratio of white color material (a pixel value corresponding to white) and the total coverage ratio of color materials.

In the following descriptions, color materials of the process colors or process color materials mean, for example, CMYK color materials, which exclude white color material; and color materials of the primary colors or primary color materials mean, for example, CMY color materials, which exclude white (W) color material which has less transparency than CMY color materials and black (K) color material which has less transparency and less reflectance than CMY color materials. Each pixel has pixel values corresponding to the colors of the color materials, where the pixel values are multi-valued and are represented in percentage or 8 bits. Pixel values in percentage correspond to, for example, pixel values of 8-bit input data ranging from 0 to 255, where 0% is equivalent to 0 of the 8-bit representation, and 100% is equivalent to 255 of the 8-bit representation.

As illustrated in FIG. 8, the printing system of the present example includes at least one client terminal 10, controller 20 and printer 30, which are located in an intranet so as to be communicably connected to each other via a communication network 40. As an example of the communication network 40, an Ethernet network may be used. Data transfer from controller 20 to printer 30 may be performed through an IEEE 1394 interface, a parallel interface, or the like, in place of an Ethernet interface.

In the example of FIG. 8, the printing system of the present example includes controller 20 and printer 30 as separated devises but controller 20 may be included in printer 30 as illustrated in FIG. 9. Hereinafter, a description of each apparatus is given on the assumption of the structure of the printing system shown in FIG. 8.

Figure 10A:
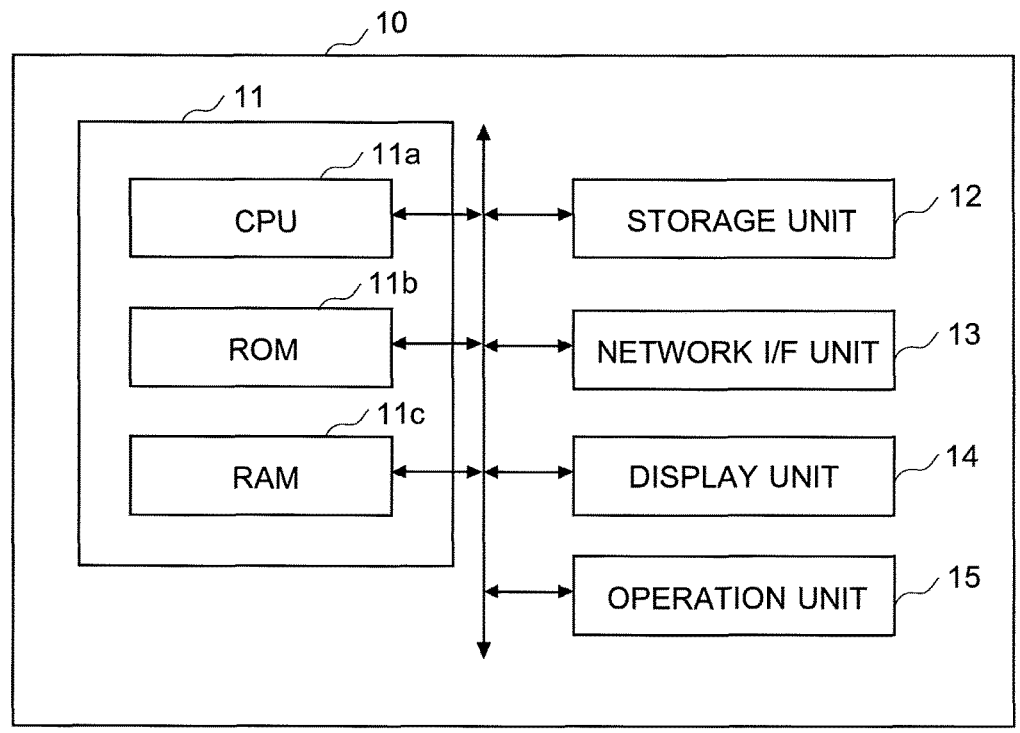
FIGS. 10A and 10B are block diagrams illustrating an example of the constitution of a client terminal according to one embodiment of the present invention.

Client Terminal:

Client terminals 10 is a computing device like a personal computer or the like. The client terminal 10 includes, as illustrated in FIG. 10A, control unit 11, storage unit 12, network interface (I/F) unit 13, display unit 14 and operation unit 15.

Figure 10B:
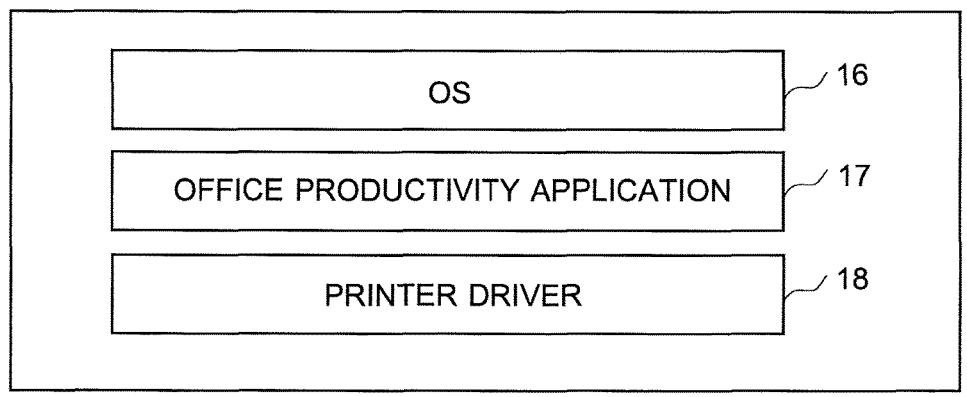

Control unit 11 includes CPU (Central Processing Unit) 11a and memories, such as ROM (Read Only Memory) 11b and RAM (Random Access Memory) 11c. CPU 11a reads control programs stored in ROM 11b or storage unit 12 to load the control programs onto RAM 11c, and then executes the control programs, thereby controlling the overall operations of client terminal 10. The control unit 11 (CPU 11a) is further configured to execute, as illustrated in FIG. 10B, OS (Operating System) 16, office productivity application 17 and printer driver 18 and other programs.

Examples of OS 16 include Windows, OS X, macOS and Android, where Windows is a registered trademark of Microsoft Corporation in the United States and/or other countries, OS X is a registered trademarks of Apple Inc. in the U.S. and other countries, macOS is a trademark of Apple Inc. in the U.S. and other countries, and Android is a trademark of Google Inc. in the United States and/or other countries. OS 16 manages office productivity application 17 and printer driver 18 in the client terminal 10 so as to function and run the programs.

Examples of office productivity application 17 include word processing, spreadsheet, and image processing software programs, which allow an operator to create a source image (preferably, a color source image) by using at least one of the process colors and specify an area where a white base is to be placed. When instructing to print original data created by the productivity application 17, office productivity application 17 invokes printer driver 18 and transfers data created by office productivity application 17 to the printer driver 18.

Printer driver 18 converts data created by office productivity application 17, into a print job written in a language that controller 20 can interpret, where examples of the print job include PDL (Page Description Language) data written in page description languages, such as PJL (Printer Job Language), PS (PostScript) and PCL (Printer Control Language); and PDF (Portable Document Format) data. Such a print job includes a source image and information of an area where a white base is to be placed.

Storage unit 12 includes a memory, such as a HDD (Hard Disk Drive), a SSD (Solid State Drive) or the like, storing programs which, when being executed, cause CPU 11a to control the components of client terminal 10, information about processing and functions of client terminal 10, data created by office productivity application 17, print jobs created by printer driver 18 and other data.

Network I/F unit 13 includes a NIC (Network Interface Card) and/or a modem. The network I/F unit 13 communicably connects client terminal 10 to communication network 40, so as to send a print job to controller 20.

Display unit 14 includes a display like a LCD (Liquid Crystal Display) or an OEL (organic electroluminescence) display, and is configured to display various types of screens of office productivity application 17 and printer driver 18, and others.

Operation unit 15 includes hardware devices, such as a mouse and a keyboard, and is configured to allow an operator to perform operations to create a source image and specify an area where a white base is to be placed by using office productivity application 17 and further allow an operator to perform operations for print instructions by using printer driver 18.

Figure 11A:
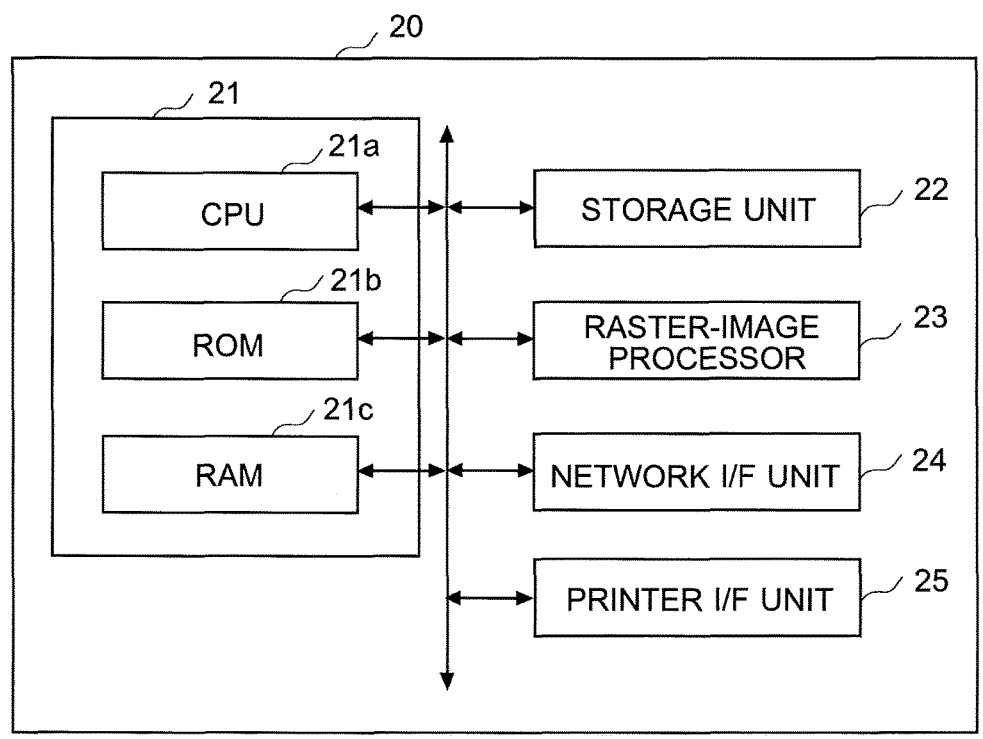
FIGS. 11A and 11B are block diagrams illustrating an example of the constitution of a controller according to one embodiment of the present invention.

Controller:

Controller 20 is a control apparatus for controlling printer 30. Controller 20 includes, as illustrated in FIG. 11A, control unit 21, storage unit 22, raster-image processor 23 and network interface (I/F) unit 24, printer interface (I/F) unit 25, and optionally includes a display unit and an operation unit.

Control unit 21 includes CPU 21a as a hardware processor, and memories, such as ROM 21b and RAM 21c. CPU 21a reads control programs stored in the ROM 21b or storage unit 22 to load the control programs onto RAM 21c, and then executes the control programs, thereby controlling the overall operations of controller 20.

Storage unit 22 includes a memory, such as a HDD, a SSD or the like. Storage unit 22 stores programs which, when being executed, causes CPU 21a to control the components of controller 20; print jobs received from client terminal 10; image data for printing, created on the basis of a print job; a correction LUT (look-up table) for printer 30; an ICC (International Color Consortium) profile to be used for color conversion; and other data.

Raster-image processor 23 includes an image-processing ASIC (application specific integrated circuit) and is configured to perform the following operations. Raster-image processor 23 analyses a print job received from client terminal 10 to obtain a source image and information of an area where a white base is to be placed, and creates multi-valued bitmap data of the source image and the white base to obtain multi-valued pixels forming the source image and multi-valued pixels forming the white base. Raster-image processor 23 then performs color conversion of the bitmap data so as to match the color of a finished product with desired color (for example, color conversion using an ICC profile), and outputs the resulting data to control unit 21.

Network I/F unit 24 includes a NIC and/or a modem. Network I/F unit 24 communicably connects controller 20 to communication network 40, so as to receive a print job or other data from client terminal 10. Printer I/F unit 25 is a dedicated interface for connecting controller 20 to printer 30, so as to output or send image data for printing or other data to printer 30 so as to give print instructions to printer 30.

Figure 11B:
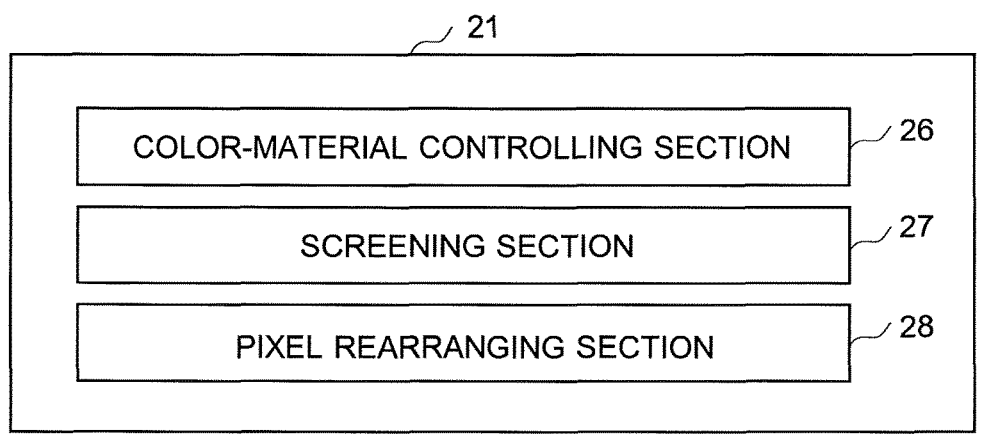

Control unit 21 is further configured to work also as color-material controlling section 26, screening section 27 and pixel rearranging section 28 as illustrated in FIG. 11B. That is, control unit 21 is configured to obtain multi-valued pixels from raster-image processor 23, prepare image data for printing, which includes sets of two-valued pixels corresponding to the color materials, forming the source image and further includes a set of rearranged two-valued white pixels forming the white base, and then output the data to printer 30.

Color-material controlling section 26 is configured to obtain multi-valued pixels forming the source image and multi-valued pixels forming the white base from raster-image processor 23 and control the amount of color materials (toners) to be used in printing the source image together with the white base, by performing the following operations. That is, color-material controlling section 26 defines pixel values of the multi-valued pixels forming the color source image and pixel values of the multi-valued pixels forming the white base so that the total sum of the pixel values corresponding to colors of the color materials of the source image and the pixel value corresponding to white at the same printing position becomes the color material limit or less. In this process, color-material controlling section 26 uses pixel values corresponding to colors of the color materials of the source image, specified for each of the multi-valued pixels forming the source image, to calculate the coverage ratios of the color materials for each of the multi-valued pixels forming the source image. Using the coverage ratios of the color materials, color-material controlling section 26 further calculates the coverage ratio of an area to be colored with at least one of the color materials (the total coverage ratio of the color materials) in the screening process of each of the multi-valued pixels forming the source image. Color-material controlling section 26 then sets the value being equal to or greater than the total coverage ratio of the color materials calculated for each of the multi-valued pixels of the source image, to the coverage ratio of white color material for the corresponding multi-valued pixel forming the white base (in other words, sets the value to a pixel value corresponding to white, specified for each of the multi-valued pixels forming the white base at the same printing position). That is, color-material controlling section 26 defines a pixel value corresponding to white, for each of the multi-valued pixels forming the white base, so that the screening process creates colored two-valued white pixels in the calculated total coverage ratio of the colored area or more for each of the multi-valued pixels forming the white base. The coverage ratio of certain color material is given as the ratio of a pixel value corresponding to the color material to the maximum possible pixel value, or given as, in the condition that one of multi-valued pixels forming the source image given after the process of controlling the amount of color materials, is converted into a matrix of two-valued pixels corresponding to colors of the color materials, the ratio of an area of two-valued pixels to be colored with the certain color material to the whole area of the matrix of two-valued pixels (corresponding to the maximum possible pixel value). For example, the total coverage ratio of the color materials of the source image is given by calculating the ratio of an area to be colored with at least one of the color materials to the whole area of the matrix of two-valued pixels.

Examples of the way to define a pixel value corresponding to white for each of the multi-valued pixels forming the white base by color-material controlling section 26, include the following two ways. The first is a way to repeat the following processes, to define a pixel value corresponding to white: a process to substitute an arbitral value for a pixel value corresponding to white, specified for one of the multi-valued pixels forming the white base; a process to, using the color material limit and the pixel value corresponding to white, define the pixel values corresponding to colors of the color materials of the source image, for each of the multi-valued pixels forming the color source image; a process to, using the pixel values corresponding to colors of the color materials of the source image, calculate the total coverage ratio of the color materials of the source image, for each of the multi-valued pixels forming the color source image; and a process to use a difference between the total coverage ratio of the color materials and a coverage ratio of white color material corresponding to the pixel value corresponding to white, to increase or decrease the pixel value corresponding to white, according to the difference. The second is a way to calculate the total coverage ratio of the color materials by denoting each of the pixel values corresponding to colors of the color materials of the color source image by x%; substituting the total coverage ratio for the pixel values corresponding to white; and finding the value of x for which the sum of the pixel values corresponding to the colors of the color materials of the source image and the pixel value corresponding to white equals the color material limit, to define the pixel value corresponding to white. In the example that each of the pixel values corresponding to the color materials (M and Y in this case) forming one of the secondary colors (R in this case) has been reduced to 80%, the coverage ratio of an area to be colored with M and Y is 64% (=80%×80%), the coverage ratio of an area to be colored just with M is 16% (=80%−64%), and the coverage ratio of an area to be colored just with Y is 16% (=80%−64%). In total, 96% (=64%+16%+16%) of the whole area is colored with any of the color materials, and therefore, the coverage ratio of white color material (a pixel value corresponding to white) is set at the value being 96% or more. In other words, since the coverage ratio of an area to be colored with M color material is 80%, the coverage ratio of an area to be colored with Y color material is 80%, the coverage ratio of an area to be colored with both of M and Y color materials is 64%, and the total coverage ratio of an area colored with at least one of the color materials (M and Y) is 96% (=80%+80%−64%), the coverage ratio of white color material (a pixel value corresponding to white) is set at the value being 96% or more.

Screening section 27 is configured to use a known process of screening or halftoning, to convert each of multi-valued pixels forming the source image and each of multi-valued pixels forming the white base both given after controlling the amount of the color materials, into matrixes of two-valued pixels corresponding to the colors of the color materials (toners) of the color source image and a matrix of two-valued white pixels corresponding to white (the color of white color material), and then create sets of two-valued pixels corresponding to the colors of the color materials, forming the source image and a set of two-valued white pixels forming the white base. Examples of the screening process includes a process based on pseudo-random distribution of halftone dots or pixels, using frequency modulation to change the density of dots or pixels according to the gray level desired, and a screening process using area gradation modulation or area coverage modulation. Each of the two-valued pixels corresponding to colors of the color materials, given after the screening process has one-bit value (ON or OFF).

Pixel rearranging section 28 is configured to perform a rearrangement of the two-valued white pixels, by using the matrixes of two-valued pixels corresponding to the colors of the color materials of the source image and the matrix of two-valued white pixels, given by converting each of the multi-valued pixels forming the source image and each of the multi-valued pixels forming the white base at the same printing position. That is, pixel rearranging section 28 uses the matrixes of two-valued pixels corresponding to the colors of the color materials of the source image, to determine first pixel positions (colored pixel positions) at each of which at least one of the two-valued pixels corresponding to the CMY primary colors is colored and second pixel positions (uncolored pixel positions) at each of which none of two-valued pixels corresponding to the primary colors is colored. Pixel rearranging section 29 then uses the matrix of two-valued white pixels, to rearrange at least one of colored two-valued white pixels at the second pixel positions (uncolored pixel positions) in the matrix of two-valued white pixels, at a pixel position or positions at each of which a colored two-valued white pixel is absent among the first pixel positions (colored pixel positions) in the matrix of two-valued white pixels (in other words, move at least one of colored two-valued white pixels at the second pixel positions, to a pixel position or positions at each of which a colored two-valued white pixel is absent among the first pixel positions, in the matrix of two-valued white pixels), and outputs a result of the rearrangement (the set of two-valued white pixels forming the white base, which have been rearranged). In this process, pixel rearranging section 28 rearranges the two-valued white pixels so that colored two-valued white pixels are located at all the first pixel positions (colored pixel positions) in the matrix of two-valued white pixels. When judging that the number of colored two-valued white pixels in the matrix of two-valued white pixels is greater than the number of the first pixel positions in the matrix of two-valued white pixels, pixel rearranging section 28 may arrange an excess of the colored two-valued white pixels over the number of the first pixel positions (colored pixel positions), at the second pixel position or positions (uncolored pixel position or positions) each neighboring one of the first pixel positions (colored pixel positions).

The color-material controlling section 26, screening section 27 and pixel rearranging section 28 may be constituted as hardware devices. Alternatively, the color-material controlling section 26, screening section 27 and pixel rearranging section 28 may be provided by an image processing program which causes the control unit 21 to function as these sections when being executed by CPU 21*a*. That is, the control unit 21 may be configured to serve as the color-material controlling section 26, screening section 27 and pixel rearranging section 28, when CPU 21*a* executes the image processing program.

Figure 12:
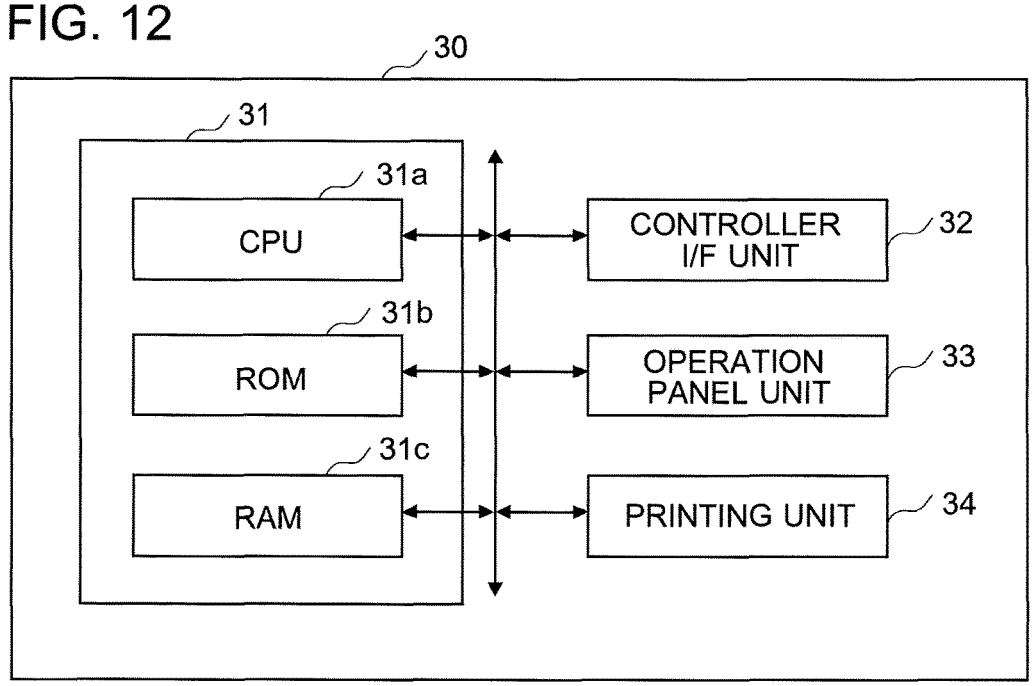
FIG. 12 is a block diagram illustrating an example of the constitution of a printer according to one embodiment of the present invention.

Printer:

Printer 30 is a printing device like an electrophotographic printer, and is configured to perform printing according to instructions given by controller 20. For example, printer 30 is configured to print a color source image together with a white base by using color materials of plural colors at least including CMY colors for the color source image and a white color material for the white base. As illustrated in FIG. 12, printer 30 includes control unit 31, controller interface (I/F) unit 32, operation panel unit 33 and printing unit 34.

Control unit 31 includes CPU 31*a* and memories including ROM 31*b* and RAM 31*c*. CPU 31*a* reads control programs stored in ROM 31*b*, loads the control programs onto RAM 31*c*, and executes the control programs, thereby performing the whole operations of the printer 30.

Controller interface unit 32 is a dedicated interface to be used for connecting printer 30 to controller 20. Controller interface unit 32 is configured to receive image data for printing and other data from controller 20.

Operation panel unit 33 is a device, such as a touch panel, which includes a display unit like a LCD and a touch sensor composed of transparent electrodes arranged in a lattice shape on the display unit. The operation panel unit 33 is configured to display various screens relating to printing and allow an operator to perform various operations relating to printing.

Printing unit 34 is a print engine configured to form images on sheets on the basis of image data for printing, received from controller 20. In concrete terms, in the printing unit 39, an exposure unit irradiates a photoreceptor drum, which was charged by a charging unit, with a laser beam in accordance with an image, to form latent images on the photoreceptor drum. A developing unit then develops the latent image by adhering charged toner onto the photoreceptor drum, and the developed toner image is transferred onto a transfer belt (first transfer processing), further is transferred from a transfer belt onto a sheet of paper (second transfer processing), and are fixed onto the sheet by a fixing unit. Printing unit 34 may be configured to further perform an arbitrary correction on the data so as to make the process of image forming stable.

It should be noted that FIG. 8 to FIG. 12 illustrate printing system of the present example for illustrative purpose only, and the constitution and control of each apparatus in the printing system may be modified appropriately.

For example, control unit 21 in FIG. 11B serves as color-material controlling section 26, screening section 27 and pixel rearranging section 28. Alternatively, raster-image processor 23 may serve as color-material controlling section 26, screening section 27 and pixel rearranging section 28.

Hereinafter, a description is given to operations of controller 20 having the above-described construction. CPU 21*a* reads an image processing program stored in ROM 21*b* or storage unit 22, loads the program onto RAM 21*c*, and executes the program, thereby performing steps of the flowcharts illustrated in FIGS. 13 to 15.

First, raster-image processor 23 of controller 20 receives a source image and information of area where a white base is to be placed (S100), where the source image is an image created by using one or more process or printing colors (for example, CMYK colors), and preferably is a color image. The information of area where a white base is to be placed is given by using data of an arbitrary form. For example, spot-color data (data of a spot color plate) given by a known DTP (desktop publishing) application or data in a dedicated format may be given as the information.

Next, raster-image processor 23 creates multi-valued bitmap data of the source image and the white base, to obtain multi-valued pixels forming the source image and multi-valued pixels forming the white base (S110). In this process, raster-image processor 23 may further perform color conversion by using an ICC profile or another color correction of the data so as to obtain desired output colors.

Figure 14:
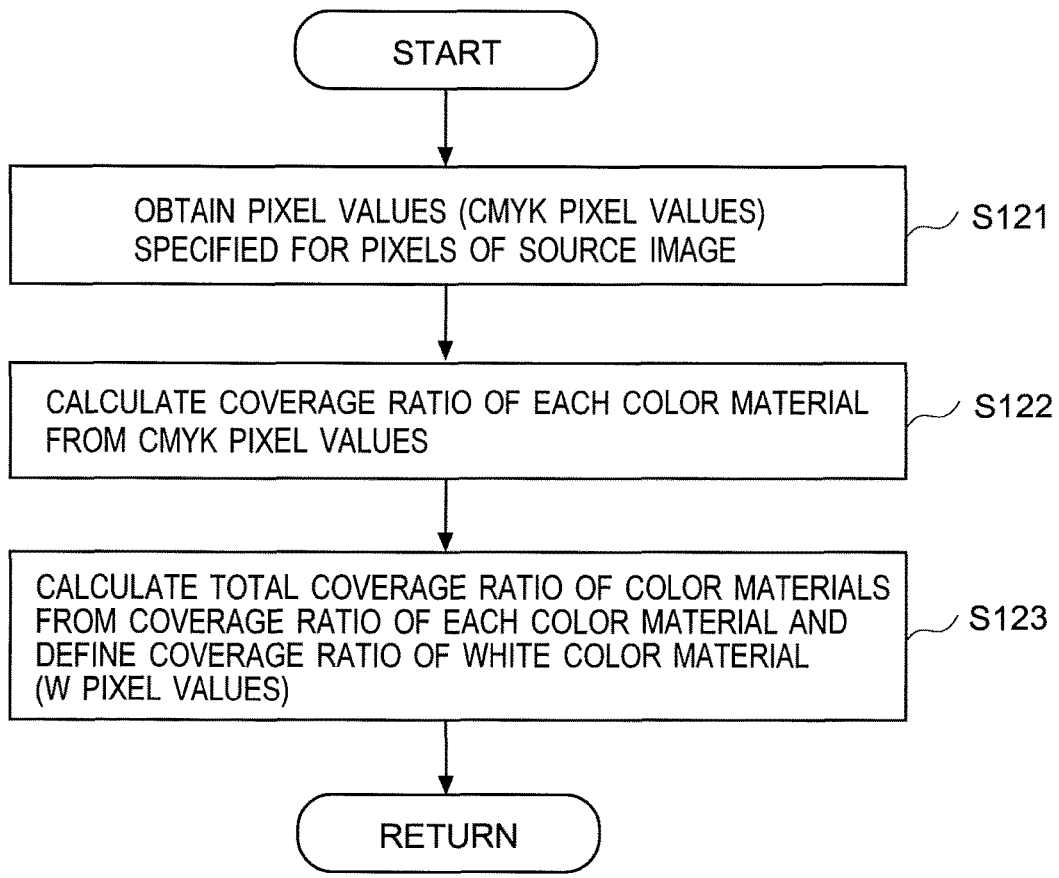
FIG. 14 is a flowchart illustrating an example of operations (controlling the amount of color materials) of the controller according to one embodiment of the present invention.

Next, control unit 21 (color-material controlling section 26) controls the amount of color materials (S120). In concrete terms, control unit 21 (color-material controlling section 26) controls the amount of color materials to be used in printing the source image and the white base together, by defining or adjusting pixel values of multi-valued pixels forming the source image and pixel values of the multi-valued pixels forming the white base so that the total sum of the pixel values corresponding to colors of the color materials of the source image and the pixel value corresponding to white of the white base at the same printing position becomes the color material limit or less. When defining the pixel value of each of the multi-valued pixels forming the white base in this process, control unit 21 (color-material controlling section 26) of the present example defines the sufficient pixel value to cover an area to be colored with any of the color materials with white color material of the white base (the pixel value to create a sufficient number of colored two-valued white pixels to cover the area to be colored with any of the color materials). FIG. 14 illustrates the detailed processing of this step. First, control unit 21 (color-material controlling section 26) obtains pixel values corresponding to colors of the color materials (CMYK pixel values), specified for each of the multi-valued pixels forming the source image (S121). Next, control unit 21 (color-material controlling section 26) uses the pixel values corresponding to colors of the color materials (CMYK pixel values), specified for each of the multi-valued pixels forming the source image, to calculate the coverage ratio of each of the color materials, for each of the multi-valued pixels forming the source image (S122). Using the coverage ratio of each of the color materials, control unit 21 (color-material controlling section 26) further calculates the total coverage ratio of the color materials (the coverage ratio of an area to be colored with at least one of the color materials) and defines the coverage ratio of white color material (a pixel value corresponding to W) as having the value of the total coverage ratio, for each of the multi-valued pixels forming the white base (S123). In concrete terms, if one of the multi-valued pixels forming the source image is colored in one of the pure secondary colors, control unit 21 (color-material controlling section 26) calculates the coverage ratio of an area to be colored with color materials of two primary colors forming the pure secondary color, the coverage ratio of an area to be colored just with color material of one of the two primary colors, and the coverage ratio of an area to be colored just with color material of the other of the two primary colors, and adds up these coverage ratios to calculate the coverage ratio of the white color material (the coverage ratio of an area to be colored with white color material). Alternatively, control unit 21 (color-material controlling section 26) may obtain the coverage ratio of the white color material by the following calculation. Control unit 21 (color-material controlling section 26) calculates the coverage ratio of an area to be colored with color materials of two primary colors forming the pure secondary color, the coverage ratio of an area to be colored at least with color material of one of the two primary colors, and the coverage ratio of an area to be colored at least with color material of the other of the two primary colors, and subtracts the coverage ratio of an area to be colored with color materials of the two primary colors from the sum of the coverage ratio of an area to be colored at least with color material of one of the two primary colors and the coverage ratio of an area to be colored at least with color material of the other of the two primary colors, to calculate the coverage ratio of the white color material.

Figure 13:
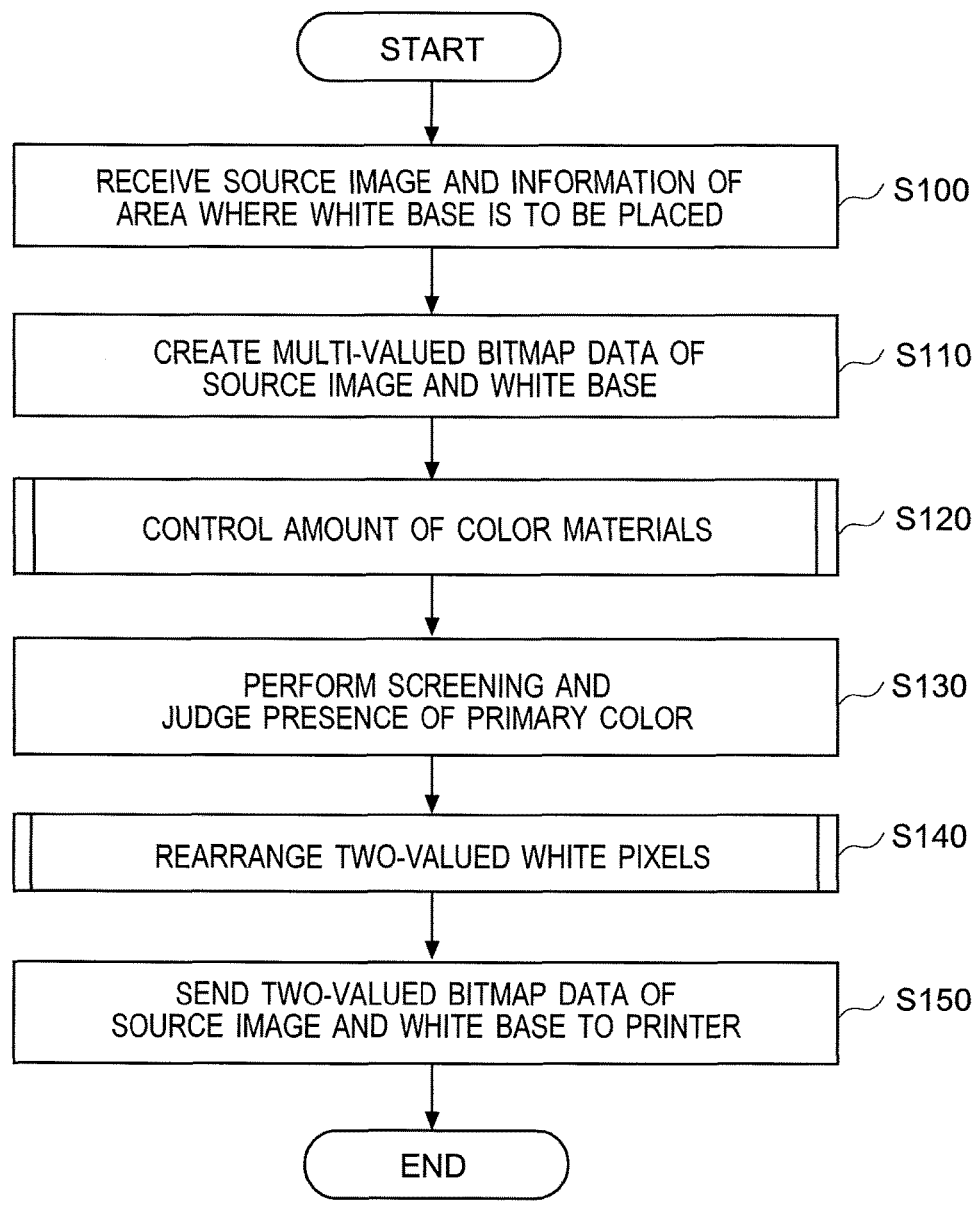
FIG. 13 is a flowchart illustrating an example of operations of the controller according to one embodiment of the present invention.

Going back to the flowchart of FIG. 13, control unit 21 (screening section 27) performs screening or halftoning (creation of two-valued image data) on the multi-valued pixels forming the source image and the multi-valued pixels forming the white base both given after limiting the amount of color materials, in other words, converts each of the multi-valued pixels forming the source image and each of the multi-valued pixels forming the white base given after controlling the amount of the color materials, into matrixes of two-valued pixels corresponding to colors of the color materials of the source image and a matrix of two-valued white pixels corresponding to white, to create sets of two-valued pixels corresponding to colors of the color materials, forming the color source image and a set of two-valued white pixels forming the white base. Control unit 21 (screening section 27) further judges presence of the primary colors (S130). Control unit 21 (screening section 27) can perform the screening or halftoning by using a well-known technique. Control unit 21 (screening section 27) then judges whether the two-valued pixels forming the source image is colored or uncolored in one of the primary colors, and labels each of the two-valued pixels as, for example, "colored" or "uncolored" in one of the primary colors.

Figure 15:
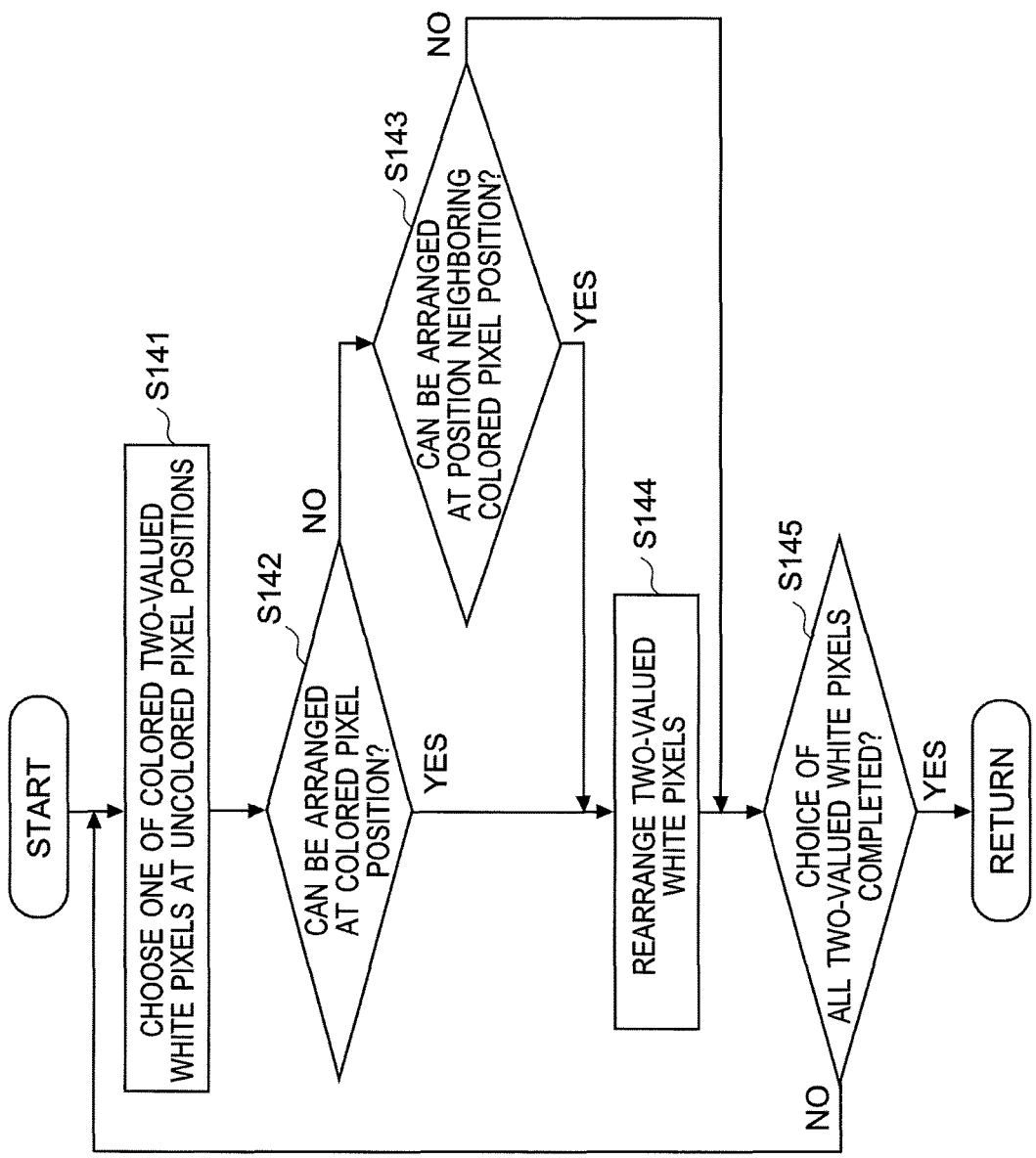
FIG. 15 is a flowchart illustrating an example of operations (rearrangement of two-valued white pixels) of the controller according to one embodiment of the present invention.

Next, control unit 21 (pixel rearranging section 28) uses matrixes of two-valued pixels corresponding to colors of the color materials of the source image, given by conversion of each of the multi-valued pixels forming the source image, to determine first pixel positions (colored pixel positions) at each of which at least one of the two-valued pixels corresponding to the primary colors is colored and second pixel positions (uncolored pixel positions) at each of which none of two-valued pixels corresponding to the primary colors is colored. Using the first pixel positions and the second pixel positions determined for each of the multi-valued pixels forming the source image, control unit 21 (pixel rearranging section 28) rearranges two-valued white pixels in the matrix of two-valued white pixels given by conversion of each of the multi-valued pixels forming the white base, which correspond to the each of the multi-valued pixels forming the source image (S140). FIG. 15 illustrates the detailed processing of this step. First, control unit 21 (pixel rearranging section 28) chooses one of colored two-valued white pixels at the second pixel positions (uncolored pixel positions) in the matrix of two-valued white pixels (S141). Next, control unit 21 (pixel rearranging section 28) judges whether the colored two-valued white pixel can be arranged at one of the first pixel positions (colored pixel positions) in the matrix of two-valued white pixels, in other words, judges whether there is a pixel position where a colored two-valued white pixel is absent among the first pixel positions in the matrix of two-valued white pixels (S142). Judging that the colored two-valued white pixel can be arranged at one of the first pixel positions (colored pixel positions), control unit 21 (pixel rearranging section 28) rearranges the colored two-valued white pixel at the second pixel position (uncolored pixel position), at one of the first pixel positions (colored pixel positions), in other words, moves the colored two-valued white pixel at the second pixel position to one of the first pixel positions (S144). Judging that the colored two-valued white pixel cannot be arranged at any of the first pixel positions (colored pixel positions), in other words, judging that there is no pixel position where a colored two-valued white pixel is absent among the first pixel positions, control unit 21 (pixel rearranging section 28) further judges whether the colored two-valued white pixel can be arranged at one of the second pixel positions (uncolored pixel positions), neighboring to one of the first pixel positions (colored pixel positions) (S143). Judging that the colored two-valued white pixel can be arranged at one of the second pixel positions, neighboring to one of the first pixel positions, control unit 21 (pixel rearranging section 28) rearranges the colored two-valued white pixel at the second pixel position neighboring one of the first pixel positions, in other words, moves the colored two-valued white pixel to the second pixel position neighboring one of the first pixel positions (S144). After that, control unit 21 (pixel rearranging section 28) judges whether the choice of the all the colored two-valued white pixels has been completed (S145). Judging that there is an unchosen two-valued white pixel, control unit 21 (pixel rearranging section 28) goes back to S141 to repeat the above-described processes.

Going back to the flowchart of FIG. 13, control unit 21 sends two-valued bitmap data (image data for printing) of the source image and the white base created from the set of two-valued pixels corresponding to colors of the color materials, forming the source image and the set of rearranged two-valued white pixels forming the white base, to printer 30 (S150). The image data for printing, to be sent to printer 30, may have an arbitrary format and control unit 21 may send printer 30 the data together with additional information if it is needed. In response to receiving the image data for printing from controller 20, printer 30 prints the color source image together with the white base by using the color materials of plural of colors for the source image and a white color material for the white base, on the basis of the image data for printing.

Figure 17A:
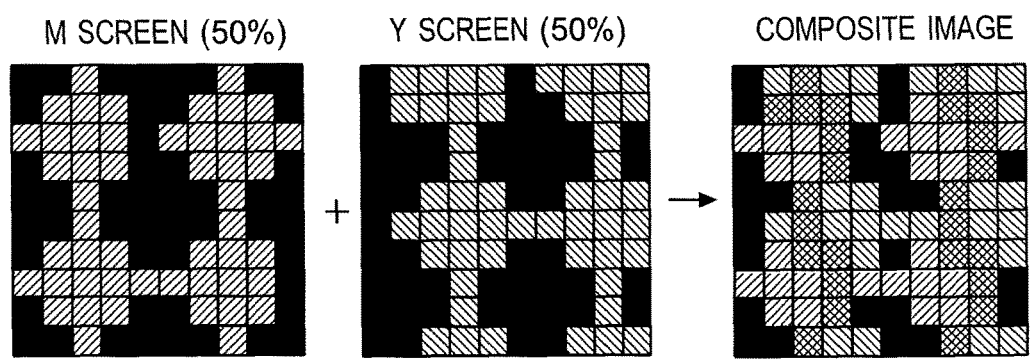
FIGS. 17A and 17B are schematic diagrams for illustrating a calculation of the coverage ratio of white color material, according to one embodiment of the present invention.
Figure 17B:
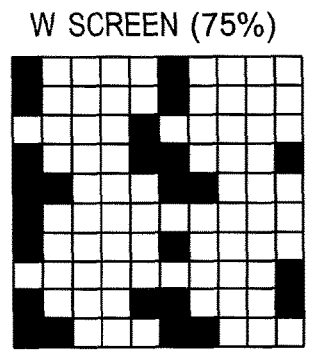

A concrete description is given to the above-described processes, with reference to FIGS. 17A and 17B. FIGS. 17A and 17B are schematic diagrams for illustrating a calculation of the coverage ratio of white color material. FIG. 17A illustrate an example of M screen and Y screen to be used for printing a source image of pure red together with a white base, where the M screen and Y screen are given by reducing each of pixel values corresponding to M and Y specified for a pixel in the source image so as to reduce each of the pixel values to 50% R (a combination of 50% M and 50% Y) and then performing a screening process on the pixel in the source image. The composite image in FIG. 17A is an image given by combining the M screen and Y screen, where different combinations of colors are represented by different types of hatching and black pixels are uncolored pixels which are pixels colored in none of M and Y. In the example of FIG. 17A, the coverage ratio of the M color material in the M screen is 50% and the coverage ratio of the Y color material in the Y screen is 50%. In the composite image, the coverage ratio of the area colored in R (colored with M and Y color materials) is 25% (=50%×50%), the coverage ratio of the area colored just with M color material is 25% (=50%−25%), the coverage ratio of the area colored just with Y color material is 25% (=50%−25%). In total, 75% (=25%+25%+25%) of the whole area is colored with any of the color materials, as illustrated in FIG. 17A. On the basis of the area colored with any of the M and Y color materials which is shown in the composite image in FIG. 17A and the calculated total coverage ratio, the control unit 21 sets the coverage ratio of white color material (a pixel value corresponding to white) at 75% in the process of controlling the amount of color material, and then arranges, as illustrated in FIG. 17B, colored two-valued white pixel at the colored pixel positions (the area to be colored with any of the M and Y color materials) in the process of rearranging two-valued white pixels. Thereby, control unit 21 can prepare a white base which covers the whole of the area colored with one or both of the M and Y color materials.

If the color material limit is 240% in this example, the total sum of the pixels values of M, Y and W is 175% (=50%+50%+75%), and there is an excess of 65% over the color material limit. By increasing the amount of white color material so that the total sum of the pixels values does not exceed the color material limit, a transparent substrate or a colored opaque substrate is much more covered with a white base and the appearance of the source image printed on the substrate comes closer to the appearance of the source image printed on white paper. When an area colored with at least one of color materials printed on a transparent substrate or a colored opaque substrate is viewed from off-center, the opposite side of the transparent substrate or the colored opaque substrate around the area is perceived. In view of that, it is preferable that, on judging that the number of colored two-valued white pixels in the matrix of two-valued white pixels is greater than the number of the first pixel positions in the matrix of two-valued white pixels, the control unit 21 arranges the excess of the colored two-valued white pixels over the number of the first pixel positions, at the second pixel position or positions each neighboring one of the first pixel positions.

As described above, control unit 21 of controller 20 uses pixel values corresponding to colors of the color materials of the source image, specified for each of the multi-valued pixels forming the source image, to calculate the coverage ratio of each of the color materials of the source image and further calculates the total coverage ratio of the color materials of the source image, which is a coverage ratio of an area to be colored with at least one of the color materials of the source image, for each of the multi-valued pixels forming the source image. Control unit 21 defines the coverage ratio of white color material (a pixel value corresponding to white) as having the value of the total coverage ratio, for each of the multi-valued pixels forming the white base, so as to rearrange colored two-valued white pixels at all the first or colored pixel positions (if necessary, also at the second pixel position or positions each neighboring one of the first pixel positions). These operations improve the color reproducibility of the source image and fully takes advantage of the color gamut which can be represented by the color materials and the coloring characteristics of the color materials.

Figure 16:
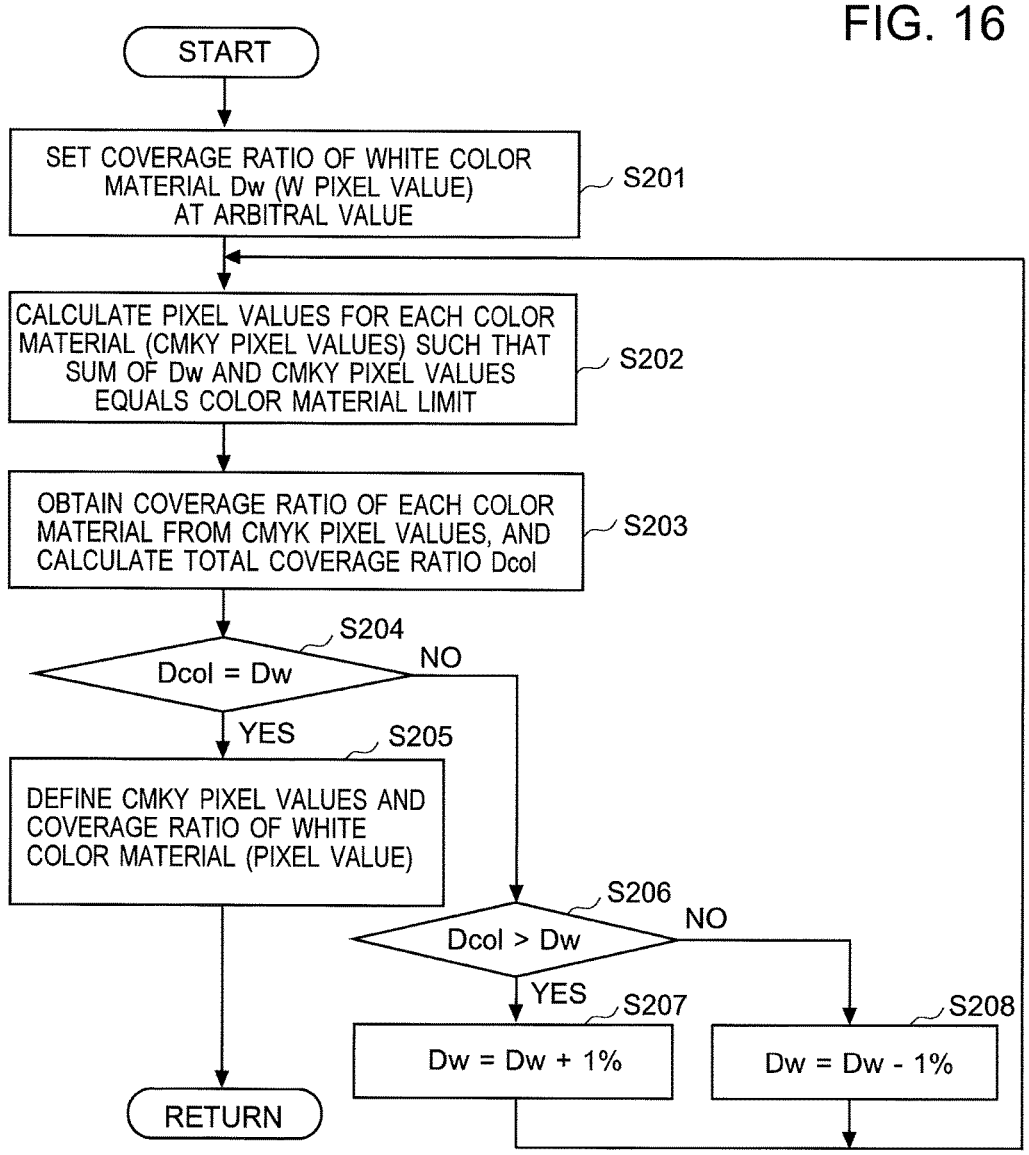
FIG. 16 is a flowchart illustrating an example of operations (another example of controlling the amount of color materials) of the controller according to one embodiment of the present invention.

The above description showed one example of the operations of the control unit 21. That is, in the process of controlling the amount of color materials, control unit 21 uses pixel values corresponding to colors of the color materials of the source image, specified for each of the multi-valued pixels forming the source image, to define a pixel value corresponding white, for each of the multi-valued pixels forming the white base. When the sum of the pixel values corresponding to colors of the color materials of the source image and the pixel value corresponding to white is less than the color material limit, the control unit 21 arranges an excess of the colored two-valued white pixels over the number of the first pixel positions, at the second pixel position or positions each neighboring one of the first pixel positions. For another example, the control unit 21 may define the pixel values corresponding to colors of the color materials of the source image, specified for each of the multi-valued pixels forming the source image and the pixel value corresponding to white, specified for each of the multi-valued pixels forming the white base so that the sum of the pixel values corresponding to colors of the color materials of the source image and the pixel value corresponding to white at a same printing position equals the color material limit (in other words, so as not to create the excess of colored two-valued white pixels over the number of the first pixel positions). In concrete terms, in the process of controlling the amount of the color materials, control unit 21 (color-material controlling section 26) defines a pixel value corresponding to white, specified for each of multi-valued pixels forming the white base, by repeating the following processing. Control unit 21 (color-material controlling section 26) substitutes an arbitrary value for the pixel value (a pixel value corresponding to white) of each of the multi-valued pixels forming the white base, and on the basis of the color material limit and the pixel value corresponding to white, defines the pixel values corresponding to colors of the color materials of the source image, specified for the corresponding multi-valued pixel forming the color source image. Control unit 21 (color-material controlling section 26) then uses the pixel values corresponding to the colors of the color materials of the source image, to calculate the total coverage ratio of the color materials of the source image (the coverage ratio of an area to be colored with at least one of the color materials). Control unit 21 (color-material controlling section 26) then uses a difference between the calculated total coverage ratio and the pixel value corresponding to white which has been defined, to increase or decrease the pixel value corresponding to white. FIG. 16 illustrates an example of the process of controlling the amount of color materials executed by control unit 21 (color-material controlling section 26), which corresponds to the process of controlling the amount of color materials at S120 in FIG. 13.

First, control unit 21 (color-material controlling section 26) sets the coverage ratio of white color material (a pixel value corresponding to white) Dw at 100% (S201). Next, control unit 21 (color-material controlling section 26) calculates pixel values corresponding to colors of the color materials of the source image (CMYK pixel values) such that the sum of Dw and the pixel values corresponding to colors of the color materials of the source image (CMYK pixel values) equals the color material limit (S202). Control unit 21 (color-material controlling section 26) then obtains the coverage ratio of each of the color materials from the CMYK pixel values, and calculates the total coverage ratio Dcol of the color materials (the coverage ratio of an area to be colored with at least one of the color materials) from the coverage ratio of each of the color materials (S203). Control unit 21 (color-material controlling section 26) then judges whether Dcol equals (almost equals) Dw (S204). Judging that Dcol does not equal Dw (NO in S204), control unit 21 (color-material controlling section 26) further judges whether Dcol is greater than Dw (S206). Judging that Dcol is greater than Dw (YES in S206), control unit 21 (color-material controlling section 26) increases the value of Dw by 1% (S207). Judging that Dcol is not greater than Dw (NO in S206), control unit 21 (color-material controlling section 26) decreases the value of Dw by 1% (S208). Control unit 21 (color-material controlling section 26) then goes back to S202 to repeat the above-described processes. When judging that Dcol equals (almost equals) Dw (YES in S204), control unit 21 (color-material controlling section 26) defines the pixel values corresponding to colors of the color materials of the source image and the coverage ratio of white color material (the pixel value corresponding to white) by using the values at the time of judgement (S205). In the processes in the flowchart of FIG. 16, the initial value of the coverage ratio of white color material (a pixel value corresponding to white) Dw is set at 100%, but the initial value may be set at an arbitrary value.

A concrete description is given to the above-described operations, with reference to FIGS. 18 and 19. Herein, there is given the example of the calculation of pixel values corresponding to colors of the color materials of the source image, specified for each of multi-valued pixels forming the source image, and a pixel value corresponding to white specified for each of multi-valued pixels forming the white base, under the condition that the source image has one of the secondary colors (color being a combination of two of the primary colors, 100% R or pure red in this case). Under the condition that the color material limit is 240%, a reduction of the amount of each of the M, Y and W color materials equally, results in 80% M, 80% Y and 80% W. A screening process of such a pixel of the white base will create an insufficient number of colored two-valued white pixels, forming the white base, and the pixel value corresponding white should be 80% or more in order to create a sufficient number of colored two-valued white pixels. In view of that, as illustrated in FIGS. 18 and 19, control unit 21 (color-material controlling section 26) calculates pixel values corresponding to M, pixel values corresponding to Y, and the total coverage ratios of the M and Y color materials (the coverage ratios of an area to be colored with at least one of the M and Y color materials), for various pixels values corresponding to white (the coverage ratio of white color material), specified for a pixel of the white base, where the pixel values corresponding to white range from 80% to 100%. Control unit 21 (color-material controlling section 26) then defines the pixel value corresponding to M (73.5%) and the pixel value corresponding to Y (73.5%) such that the pixel value corresponding to Y (the coverage ratio of white color material) equals the total coverage ratio of the color materials of the source image (in this case, such that the pixel value corresponding to white equals 93.0%). This processing allows control unit 21 to create the white base so as to cover all the area to be colored with at least one of the color materials of the source image, and use of the amount of each of the color materials of the source image as much as possible within the color material limit. In this example, the pixel value corresponding to M and the pixel value corresponding to Y are changed equally for simplification purposes. Alternatively, the pixel value corresponding to M and the pixel value corresponding to Y may be changed separately, according to the properties of printing unit 34 or the characteristics of the color materials.

The above description showed one example of the operations of the control unit 21. That is, in the process of controlling the amount of color materials, control unit 21 calculates various values of the total coverage ratio of the color materials of the source image (a coverage ratio of an area to be colored with at least one of the color materials), for each of multi-valued pixels forming the source image, while gradually changing the pixel value corresponding to white, specified for the corresponding multi-valued pixel in the white base (the coverage ratio of white color material). When judging that the pixel value corresponding to white (the coverage ratio of white color material) becomes equal to the total coverage ratio of the color materials, control unit 21 defines the pixel values corresponding to colors of the color materials of the source image and the pixel value corresponding to white for the white base by using the values given at the judgement, for each of multi-valued pixels forming the source image and each of multi-valued pixels forming the white base. Alternatively, the control unit 21 may perform the following operations, to obtain the pixel values corresponding to colors of the color materials of the source image and the pixel value corresponding to white for the white base, for each of multi-valued pixels forming the source image and each of multi-valued pixels forming the white base. That is, control unit 21 calculates the total coverage ratio of the color materials of the source image by denoting each of the pixel values corresponding to colors of the color materials of the source image by x%, and substituting the total coverage ratio for the pixel value corresponding to white. Control unit 21 then finds the value of x for which the sum of the pixel values corresponding to colors of the color materials of the source image and the pixel value corresponding to white equals the color material limit. In the example that the source image has one of the pure secondary colors, control unit 21 can obtain the pixel values corresponding to colors of the color materials of the source image and the pixel value corresponding to white for the white base, by solving a quadratic equation for x.

A concrete example of the operations of the control unit 21 when the source image has one secondary color represented by a combination of two of the primary colors of C, M and Y colors, is given. In the process of controlling the material of color materials, control unit 21 (color-material controlling section 26) calculates the total coverage ratio of the color materials of the source image (the coverage ratio of an area to be colored with at least one of the color materials) by denoting the pixel values corresponding to each of the two of the primary colors by x%, and substitutes the calculated total coverage ratio for the pixel value corresponding to white. Control unit 21 (color-material controlling section 26) then creates a quadratic equation that the sum of the pixel values corresponding to the two of the primary colors and the pixel value corresponding to white for the white base equals the color material limit. Assuming that the pixel values corresponding to each of the two of the primary colors is x/100 (x%), the coverage ratio of one of the two of the primary colors is x/100, the coverage ratio of the other of the two of the primary colors is x/100, and the coverage ratio of an area to be colored with both of the two of the primary colors is given as x/100×x/100. The total coverage ratio (the coverage ratio of an area to be colored with at least one of the color materials) is given as (x/100+x/100)−(x/100×x/100). Since the total coverage ratio equals the coverage ratio of white color material (a pixel value corresponding to white), the sum of the pixel values corresponding to two of the primary colors and the pixel value corresponding to white for the white base is given by adding the coverage ratio of one of the two of the primary colors (x/100), the coverage ratio of the other of the two of the primary colors (x/100), and the coverage ratio of white color material given as (x/100+x/100)−(x/100×x/100). Since the sum equals the color material limit, the following mathematical expression (1) is given for the color material limit of 240%. Finally, the quadratic equation (2) is given.

$$x/100+x/100+(x/100+x/100)-(x/100 \times x/100)=4x/100-(x/100)^2=240/100 \quad (1)$$

$$x^2-400x+24000=0 \quad (2)$$

The solution of the equation for x is given by the following mathematical expression (3), and on the basis of the value of x, the pixel values corresponding to each of the two of the primary colors and the pixel value corresponding to white for the white base is given. The value of x matches with the values shown in FIGS. 18 and 19.

$$x=(400 \pm (400^2-4 \times 24000)^{1/2})/2=73.5 \quad (3)$$

Next, another example of the operations of the control unit 21 when the source image has one tertiary color represented by a combination of three of the primary colors of C, M and Y colors, is given. In the process of controlling the material of color materials, control unit 21 (color-material controlling section 26) calculates the total coverage ratio of the color materials of the source image (the coverage ratio of an area to be colored with at least one of the color materials) by denoting the pixel values corresponding to each of three of the primary colors by x%, and substitutes the calculated total coverage ratio for the pixel value corresponding to white. Control unit 21 (color-material controlling section 26) then creates a cubic equation that the sum of the pixel values corresponding to the three of the primary colors and the pixel value corresponding to white for the white base equals the color material limit. Assuming that the pixel values corresponding to each of the three of the primary colors is x/100 (x%), the coverage ratio of the first of the thee of the primary colors is x/100, the coverage ratio of the second of the thee of the primary colors is x/100, the coverage ratio of the third of the three of the primary colors is x/100, the coverage ratio of an area to be colored with both of the first and the second of the three of the primary colors is given as x/100×x/100, the coverage ratio of an area to be colored with both of the first and the third of the three of the primary colors is given as x/100×x/100, the coverage ratio of an area to be colored with both of the second and the third of the three of the primary colors is given as x/100×x/100, and the coverage ratio of an area to be colored with all of the three of the primary colors is given as x/100×x/100×x/100. The total coverage ratio (the coverage ratio of an area to be colored with at least one of the color materials) is given as (x/100+x/100+x/100)−(x/100×x/100+x/100×x/100+x/100×x/100)+(x/100×x/100×x/100+x/100×x/100×x/100)=3×x/100−3×x/100×x/100+2×x/100×x/100×x/100. Since the total coverage ratio equals the coverage ratio of white color material (a pixel value corresponding to white), the sum of the pixel values corresponding to the three of the primary colors and the pixel value corresponding to white for the white base is given by adding the coverage ratio of the first of the three of the primary colors (x/100), the coverage ratio of the second of the three of the primary colors (x/100), the coverage ratio of the third of the three of the primary colors (x/100), and the coverage ratio of white color material given as 3×x/100−3×x/100×x/100+2×x/100×x/100×x/100. Since the sum equals the color material limit, the pixel values corresponding to each of colors of the color materials of the source image and the pixel value corresponding to white for the white base is given by creating a cubic equation that the sum equals a certain value of the color material limit and solving the cubic equation for x.

An increase of the number of primary colors used for representing color of a multi-valued pixel in the source image, increases an area to be printed together with a white base (an area to be colored with white color material) in the multi-valued pixel in the source image. On the other hand, it decreases the amount of each of color materials to be used for printing the source image together with the white base. In view of that, in the process of controlling the amount of color materials, control unit 21 may define the color material limit on the basis of the maximum number of the primary colors used for representing color in a print job (the maximum number of the primary colors used for representing color of a multi-valued pixel among the multi-valued pixels forming the source image). Calculating the maximum total pixel value in the source image on the basis of the defined color material limit, allows the control apparatus to prepare the white base and the source image to be printed with a printer, with securing the sufficient amount of color material for the white base which can cover all the area to be colored with at least one of color materials of the source material and with increasing the amount of each of the color materials.

The present invention should not be limited to the description in the above-mentioned examples, and the constitution and control may be modified appropriately unless the modification deviates from the intention of the present invention.

For example, the above-mentioned examples employ an electrophotographic printer as an example of printer 30, but an inkjet printer using UV (ultraviolet) curable inks can use the above-described image processing method similarly.

The present invention is applicable to control apparatuses configured to control a process of printing a source image together with a white base, image processing methods of controlling preparation of the white base, image processing programs executing the image processing method, and non-transitory recording media each storing the image processing program.

Although embodiments of the present invention have been described and illustrated in detail, it is clearly understood that the same is by way of illustration and example only and not limitation, the scope of the present invention should be interpreted by terms of the appended claims

The invention claimed is:

1. A control apparatus for controlling a printing device configured to print a color source image together with a white base by using color materials of a plurality of colors including cyan, magenta and yellow for the source image and a white color material for the white base, the control apparatus comprising:
a raster-image processor that creates multi-valued pixels forming the source image and multi-valued pixels forming the white base; and a hardware processor that
controls an amount of the color materials to be used in printing the source image together with the white base, by defining pixel values of the multi-valued pixels forming the source image and pixel values of the multi-valued pixels forming the white base so that a total sum of the pixel values corresponding to colors of the color materials of the source image and the pixel value corresponding to white at a same printing position becomes a color material limit or less, by using screening, converts each of the multi-valued pixels forming the source image and each of the multi-valued pixels forming the white base given after controlling the amount of the color materials, into matrixes of two-valued pixels corresponding to the colors of the color materials of the source image and a matrix of two-valued white pixels corresponding to white, to create sets of two-valued pixels corresponding to the colors of the color materials, forming the source image and a set of two-valued white pixels forming the white base, and performs a rearrangement of the two-valued white pixels, by using the matrixes of two-valued pixels corresponding to the colors of the color materials of the source image and the matrix of two-valued white pixels, given by converting each of the multi-valued pixels forming the source image and each of the multi-valued pixels forming the white base at a same printing position, the rearrangement including using the matrixes of two-valued pixels corresponding to the colors of the color materials of the source image, to determine first pixel positions at each of which at least one of the two-valued pixels corresponding to primary colors of cyan, magenta and yellow is colored and second pixel positions at each of which none of two-valued pixels corresponding to the primary colors is colored, using the matrix of two-valued white pixels, to rearrange at least one of colored two-valued white pixels at the second pixel positions in the matrix of two-valued white pixels, at a pixel position or positions at each of which a colored two-valued white pixel is absent among the first pixel positions in the matrix of two-valued white pixels, and outputting the set of two-valued white pixels forming the white base, which have been rearranged, wherein in controlling the amount of the color materials, the hardware processor uses the pixel values corresponding to the colors of the color materials of the source image, specified for each of the multi-valued pixels forming the source image, to calculate a total coverage ratio of the color materials of the source image, being a ratio of an area to be colored with at least one of the color materials of the source image to a whole area of the matrix of the two-valued pixels, for each of the multi-valued pixels forming the source image, and defines the pixel value corresponding to white, specified for each of the multi-valued pixels forming the white base, corresponding to the each of the multi-valued pixels forming the source image, such that colored two-valued white pixels exist in a coverage ratio being equal to or greater than the total coverage ratio, in the matrix of two-valued white pixels corresponding to the each of the multi-valued pixels forming the white base, and wherein in the rearrangement, the hardware processor arranges the two-valued white pixels so that the colored two-valued white pixels are located at all the first pixel positions.

2. The control apparatus of claim 1,
wherein in the rearrangement, on judging that a number of colored two-valued white pixels in the matrix of two-valued white pixels is greater than a number of the first pixel positions in the matrix of two-valued white pixels, the hardware processor arranges an excess of the colored two-valued white pixels over the number of the first pixel positions, at the second pixel position or positions each neighboring one of the first pixel positions.

3. The control apparatus of claim 1,
wherein in controlling the amount of the color materials, the hardware processor defines the pixel value corresponding to white, specified for each of the multi-valued pixels forming the white base, by repeating processing including:
substituting an arbitrary value for the pixel value corresponding to white,
on a basis of the color material limit and the pixel value corresponding to white, defining the pixel values corresponding to the colors of the color materials of the source image, specified for the corresponding multi-valued pixel forming the color source image,
using the pixel values corresponding to the colors of the color materials of the source image, to calculate the total coverage ratio of the color materials of the source image, and
using a difference between the total coverage ratio and a coverage ratio of the white color material, to increase or decrease the pixel value corresponding to white, wherein the coverage ratio of the white color material is a coverage ratio of an area to be colored with the white color material in the matrix of two-valued white pixels corresponding to the each of the multi-valued pixels forming the white base, and is given by the pixel value corresponding to white.

4. The control apparatus of claim 1,
wherein in controlling the amount of the color materials, the hardware processor defines the pixel value corresponding to white, specified for each of the multi-valued pixels forming the white base, by
calculating the total coverage ratio of the color materials of the source image, by denoting each of the pixel values corresponding to the colors of the color materials of the source image by x%,
substituting the total coverage ratio for the pixel value corresponding to white, and
finding a value of x for which a sum of the pixel values corresponding to the colors of the color materials of the source image and the pixel value corresponding to white equals the color material limit.

5. The control apparatus of claim 4,
wherein the source image has a secondary color being a combination of two of the primary colors, and
in controlling the amount of the color materials, the hardware processor defines the pixel value corresponding to white, specified for each of the multi-valued pixels forming the white base, by
calculating the total coverage ratio of the color materials of the source image, by denoting each of the pixel values corresponding to the two of the primary colors by x%, substituting the total coverage ratio for the pixel value corresponding to white, creating a quadratic equation that a sum of the pixel values corresponding to the two of the primary colors and the pixel value corresponding to white equals the color material limit, and finding a value of x in the quadratic equation.

6. The control apparatus of claim 4,
wherein the source image has a tertiary color being a combination of three of the primary colors, and
in controlling the amount of the color materials, the hardware processor defines the pixel value corresponding to white, specified for each of the multi-valued pixels forming the white base, by calculating the total coverage ratio of the color materials of the source image, by denoting each of the pixel values corresponding to the three of the primary colors by x%, substituting the total coverage ratio for the pixel value corresponding to white, creating a cubic equation that a sum of the pixel values corresponding to the three of the primary colors and the pixel value corresponding to white equals the color material limit, and finding a value of x in the cubic equation.

7. The control apparatus of claim 1,
wherein in controlling the amount of the color materials, the hardware processor defines the color material limit on a basis of a maximum number of the primary colors used for representing color of a multi-valued pixel among the multi-valued pixels forming the source image.

8. A method of image processing for use in a printing system including a printing device and a control apparatus for controlling the printing device, the printing device being configured to print a color source image together with a white base by using color materials of a plurality of colors including cyan, magenta and yellow for the source image and a white color material for the white base, the method comprising:

using a raster-image processor of the control apparatus to create multi-valued pixels forming the source image and multi-valued pixels forming the white base;

controlling by a hardware processor of the control apparatus, an amount of the color materials to be used in printing the source image together with the white base, by defining pixel values of the multi-valued pixels forming the source image and pixel values of the multi-valued pixels forming the white base so that a total sum of the pixel values corresponding to colors of the color materials of the source image and the pixel value corresponding to white at a same printing position becomes a color material limit or less;

by using screening, converting, by the hardware processor, each of the multi-valued pixels forming the source image and each of the multi-valued pixels forming the white base given after controlling the amount of the color materials, into matrices of two-valued pixels corresponding to the colors of the color materials of the source image and a matrix of two-valued white pixels corresponding to white, to create sets of two-valued pixels corresponding to the colors of the color materials, forming the source image and a set of two-valued white pixels forming the white base; and rearranging the two-valued white pixels by the hardware processor, by using the matrixes of two-valued pixels corresponding to the colors of the color materials of the source image and the matrix of two-valued white pixels, given by converting each of the multi-valued pixels forming the source image and each of the multi-valued pixels forming the white base at a same printing position, the rearranging including using the matrixes of two-valued pixels corresponding to the colors of the color materials of the source image, to determine first pixel positions at each of which at least one of the two-valued pixels corresponding to primary colors of cyan, magenta and yellow is colored and second pixel positions at each of which none of two-valued pixels corresponding to the primary colors is colored, using the matrix of two-valued white pixels, to rearrange at least one of colored two-valued white pixels at the second pixel positions in the matrix of two-valued white pixels, at a pixel position or positions at each of which a colored two-valued white pixel is absent among the first pixel positions in the matrix of two-valued white pixels, and outputting the set of two-valued white pixels forming the white base, which have been rearranged, wherein the controlling includes using the pixel values corresponding to the colors of the color materials of the source image, specified for each of the multi-valued pixels forming the source image, to calculate a total coverage ratio of the color materials of the source image, being a ratio of an area to be colored with at least one of the color materials of the source image to a whole area of the matrix of the two-valued pixels, for each of the multi-valued pixels forming the source image, and defining the pixel value corresponding to white, specified for each of the multi-valued pixels forming the white base, corresponding to the each of the multi-valued pixels forming the source image, such that colored two-valued white pixels exist in a coverage ratio being equal to or greater than the total coverage ratio, in the matrix of two-valued white pixels corresponding to the each of the multi-valued pixels forming the white base, and wherein the rearranging includes arranging the two-valued white pixels so that the colored two-valued white pixels are located at all the first pixel positions.

9. The method of claim 8,
wherein the rearranging includes, on judging that a number of colored two-valued white pixels in the matrix of two-valued white pixels is greater than a number of the first pixel positions in the matrix of two-valued white pixels, arranging an excess of the colored two-valued white pixels over the number of the first pixel positions, at the second pixel position or positions each neighboring one of the first pixel positions.

10. The method of claim 8,
wherein the controlling includes defining the pixel value corresponding to white, specified for each of the multi-valued pixels forming the white base, by repeating processing including:

substituting an arbitrary value for the pixel value corresponding to white, on a basis of the color material limit and the pixel value corresponding to white, defining the pixel values corresponding to the colors of the color materials of the source image, specified for the corresponding multi-valued pixel forming the color source image, using the pixel values corresponding to the colors of the color materials of the source image, to calculate the total coverage ratio of the color materials of the source image, and using a difference between the total coverage ratio and a coverage ratio of the white color material, to increase or decrease the pixel value corresponding to white, wherein the coverage ratio of the white color material is a coverage ratio of an area to be colored with the white color material in the matrix of two-valued white pixels corresponding to the each of the multi-valued pixels forming the white base, and is given by the pixel value corresponding to white.

11. The method of claim 8,
wherein the controlling includes defining the pixel value corresponding to white, specified for each of the multi-valued pixels forming the white base, by
calculating the total coverage ratio of the color materials of the source image, by denoting each of the pixel values corresponding to the colors of the color materials of the source image by x%,
substituting the total coverage ratio for the pixel value corresponding to white, and
finding a value of x for which a sum of the pixel values corresponding to the colors of the color materials of the source image and the pixel value corresponding to white equals the color material limit.

12. The method of claim 11,
wherein the source image has a secondary color being a combination of two of the primary colors, and
the controlling includes defining the pixel value corresponding to white, specified for each of the multi-valued pixels forming the white base, by
calculating the total coverage ratio of the color materials of the source image, by denoting each of the pixel values corresponding to the two of the primary colors by x%,
substituting the total coverage ratio for the pixel value corresponding to white,
creating a quadratic equation that a sum of the pixel values corresponding to the two of the primary colors and the pixel value corresponding to white equals the color material limit, and
finding a value of x in the quadratic equation.

13. The method of claim 11,
wherein the source image has a tertiary color being a combination of three of the primary colors, and
the controlling includes defining the pixel value corresponding to white, specified for each of the multi-valued pixels forming the white base, by
calculating the total coverage ratio of the color materials of the source image, by denoting each of the pixel values corresponding to the three of the primary colors by x%,
substituting the total coverage ratio for the pixel value corresponding to white,
creating a cubic equation that a sum of the pixel values corresponding to the three of the primary colors and the pixel value corresponding to white equals the color material limit, and
finding a value of x in the cubic equation.

14. The method of claim 8,
wherein the controlling includes defining the color material limit on a basis of a maximum number of the primary colors used for representing color of a multi-valued pixel among the multi-valued pixels forming the source image.

15. A non-transitory recording medium storing a computer-readable program for image processing to be executed in a control apparatus for controlling a printing device configured to print a color source image together with a white base by using color materials of a plurality of colors including cyan, magenta and yellow for the source image and a white color material for the white base, the control apparatus including a raster-image processor that creates multi-valued pixels forming the source image and multi-valued pixels forming the white base, the program comprising instructions which, when executed by a hardware processor of the control apparatus, cause the control apparatus to perform operations comprising:

obtaining the multi-valued pixels forming the source image and the multi-valued pixels forming the white base, from the raster-image processor;

controlling an amount of the color materials to be used in printing the source image together with the white base, by defining pixel values of the multi-valued pixels forming the source image and pixel values of the multi-valued pixels forming the white base so that a total sum of the pixel values corresponding to colors of the color materials of the source image and the pixel value corresponding to white at a same printing position becomes a color material limit or less;

by using screening, converting each of the multi-valued pixels forming the source image and each of the multi-valued pixels forming the white base given after controlling the amount of the color materials, into matrixes of two-valued pixels corresponding to the colors of the color materials of the color source image and a matrix of two-valued white pixels, corresponding to white, to create sets of two-valued pixels corresponding to the colors of the color materials, forming the source image and a set of two-valued white pixels forming the white base; and rearranging the two-valued white pixels, by using the matrixes of two-valued pixels corresponding to the colors of the color materials of the source image and the matrix of two-valued white pixels, given by converting each of the multi-valued pixels forming the source image and each of the multi-valued pixels forming the white base at a same printing position, the rearranging including using the matrixes of two-valued pixels corresponding to the colors of the color materials of the source image, to determine first pixel positions at each of which at least one of the two-valued pixels corresponding to primary colors of cyan, magenta and yellow is colored and second pixel positions at each of which none of two-valued pixels corresponding to the primary colors is colored, using the matrix of two-valued white pixels, to rearrange at least one of colored two-valued white pixels at the second pixel positions in the matrix of two-valued white pixels, at a pixel position or positions at each of which a colored two-valued white pixel is absent among the first pixel positions in the matrix of two-valued white pixels, and outputting the set of two-valued white pixels forming the white base, which have been rearranged, wherein the controlling includes
using the pixel values corresponding to the colors of the color materials of the source image, specified for each of the multi-valued pixels forming the source image, to calculate a total coverage ratio of the color materials of the source image, being a ratio of an area to be colored with at least one of the color materials of the source image to a whole area of the matrix of the two-valued pixels, for each of the multi-valued pixels forming the source image, and defining the pixel value corresponding to white, specified for each of the multi-valued pixels forming the white base, corresponding to the each of the multi-valued pixels forming the source image, such that colored two-valued white pixels exist in a coverage ratio being equal to or greater than the total coverage ratio, in the matrix of two-valued white pixels corresponding to the each of the multi-valued pixels forming the white base, and wherein the rearranging includes arranging the two-valued white pixels so that the colored two-valued white pixels are located at all the first pixel positions.

16. The non-transitory recording medium of claim 15, wherein the rearranging includes, on judging that a number of colored two-valued white pixels in the matrix of two-valued white pixels is greater than a number of the first pixel positions in the matrix of two-valued white pixels, arranging an excess of the colored two-valued white pixels over the number of the first pixel positions, at the second pixel position or positions each neighboring one of the first pixel positions.

17. The non-transitory recording medium of claim 15, wherein the controlling includes defining the pixel value corresponding to white, specified for each of the multi-valued pixels forming the white base, by repeating processing including:

substituting an arbitrary value for the pixel value corresponding to white, on a basis of the color material limit and the pixel value corresponding to white, defining the pixel values corresponding to the colors of the color materials of the source image, specified for the corresponding multi-valued pixel forming the color source image, using the pixel values corresponding to the colors of the color materials of the source image, to calculate the total coverage ratio of the color materials of the source image, and using a difference between the total coverage ratio and a coverage ratio of the white color material, to increase or decrease the pixel value corresponding to white, wherein the coverage ratio of the white color material is a coverage ratio of an area to be colored with the white color material in the matrix of two-valued white pixels corresponding to the each of the multi-valued pixels forming the white base, and is given by the pixel value corresponding to white.

18. The non-transitory recording medium of claim 15, wherein the controlling includes defining the pixel value corresponding to white, specified for each of the multi-valued pixels forming the white base, by calculating the total coverage ratio of the color materials of the source image, by denoting each of the pixel values corresponding to the colors of the color materials of the source image by x%, substituting the total coverage ratio for the pixel value corresponding to white, and finding a value of x for which a sum of the pixel values corresponding to the colors of the color materials of the source image and the pixel value corresponding to white equals the color material limit.

19. The non-transitory recording medium of claim 18, wherein the source image has a secondary color being a combination of two of the primary colors, and the controlling includes defining the pixel value corresponding to white, specified for each of the multi-valued pixels forming the white base, by calculating the total coverage ratio of the color materials of the source image, by denoting each of the pixel values corresponding to the two of the primary colors by x%, substituting the total coverage ratio for the pixel value corresponding to white, creating a quadratic equation that a sum of the pixel values corresponding to the two of the primary colors and the pixel value corresponding to white equals the color material limit, and finding a value of x in the quadratic equation.

20. The non-transitory recording medium of claim 18, wherein the source image has a tertiary color being a combination of three of the primary colors, and the controlling includes defining the pixel value corresponding to white, specified for each of the multi-valued pixels forming the white base, by calculating the total coverage ratio of the color materials of the source image, by denoting each of the pixel values corresponding to the three of the primary colors by x%, substituting the total coverage ratio for the pixel value corresponding to white, creating a cubic equation that a sum of the pixel values corresponding to the three of the primary colors and the pixel value corresponding to white equals the color material limit, and finding a value of x in the cubic equation.

21. The non-transitory recording medium of claim 15, wherein the controlling includes defining the color material limit on a basis of a maximum number of the primary colors used for representing color of a multi-valued pixel among the multi-valued pixels forming the source image.

* * * * *